(12) United States Patent
Togawa et al.

(10) Patent No.: US 8,005,219 B2
(45) Date of Patent: Aug. 23, 2011

(54) DATA DECRYPTION APPARATUS AND DATA ENCRYPTION APPARATUS

(75) Inventors: Taro Togawa, Kawasaki (JP); Kaori Endo, Kawasaki (JP); Takeshi Otani, Kawasaki (JP); Masakiyo Tanaka, Kawasaki (JP); Yasuji Ota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1064 days.

(21) Appl. No.: 11/878,304

(22) Filed: Jul. 23, 2007

(65) Prior Publication Data
US 2008/0037788 A1 Feb. 14, 2008

(30) Foreign Application Priority Data
Aug. 14, 2006 (JP) .................................. 2006-221180

(51) Int. Cl.
*H04L 9/00* (2006.01)
(52) U.S. Cl. ........... 380/260; 380/278; 380/273; 380/33
(58) Field of Classification Search .................... 380/33, 380/247–249, 223, 274
See application file for complete search history.

(56) References Cited

U.S. PATENT DOCUMENTS
5,822,430 A * 10/1998 Doud ............................ 380/260
6,157,723 A   12/2000 Schultz
6,460,137 B1  10/2002 Akiyama et al.
2003/0046539 A1  3/2003 Negawa
2005/0015597 A1  1/2005 Higurashi
2006/0140410 A1  6/2006 Aihara FOREIGN PATENT DOCUMENTS
JP   11-103290    4/1999
JP   2003-69547   3/2003
JP   2005-39643   2/2005
JP   2005-217843  8/2005

OTHER PUBLICATIONS
Extended European Search Report, mailed Dec. 19, 2007 and issued in corresponding European Patent Application No. 07112703.9-2415.

* cited by examiner

*Primary Examiner* — Gilberto Barron, Jr.
*Assistant Examiner* — Virginia T Ho
(74) *Attorney, Agent, or Firm* — Fujitsu Patent Center

(57) ABSTRACT

A data decryption apparatus that decrypts encrypted data, includes a first data-receiving unit that receives a first data set, in which information on an encryption specification is embedded, through a first communication path; a time-information obtaining unit that obtains time information on a reception of the first data set by the first data receiving unit; a time-information storage unit that stores the time information with the information on the encryption specification associated therewith; a second data-receiving unit that receives a second data set through a second communication path, the second data set being encrypted based on the encryption-specification and appended by time information on performing data encryption; and an encryption-specification selecting unit that selects an encryption specification for use in decryption of the second data set based on the time information stored in the time-information storage unit and the time information appended to the second data set.

18 Claims, 13 Drawing Sheets

ENCRYPTION KEY INFORMATION
20j

| ENCRYPTION KEY | CALL DURATION TIME |
|---|---|
| KEY A | T1 |
| KEY B | T5 |
| KEY C | T8 |

ENCRYPTION SPECIFICATION INFORMATION 90

| ENCRYPTION KEY | ENCRYPTION-METHOD ID |
|---|---|
| ***** | 3 |

DATA DECRYPTION APPARATUS AND DATA ENCRYPTION APPARATUS

BACKGROUND OF THE INVENTION

1. Field of the Invention

The present invention relates to a data decryption apparatus that decrypts encrypted data and a data encryption apparatus that encrypts data, and, more specifically to a data decryption apparatus and a data encryption apparatus that allow secure and efficient data exchange between the apparatuses.

2. Description of the Related Art

Conventionally, an integrated communication service that carries out data communications of user data, as well as bi-directional communications of multimedia information, such as voice data for a voice call and image data for a video telephone, has been provided. When data to be transmitted must be protected from interception by a third party, the data is encrypted.

To decrypt encrypted data, information on an encryption key used in encryption of the data must be shared between an encryption apparatus that encrypts the data and a decryption apparatus that decrypts the data. To attain this information-on-encryption-key sharing with small-scale hardware, a technique of transmitting information on an encryption key by embedding the information on the encryption key in a random number has been developed (see Japanese Patent Application Laid-open No. H11-103290).

When information on an encryption key is transmitted from a data encryption apparatus to a data decryption apparatus through the same communication path as that used in transmission of encrypted data, the encrypted data and the information on the encryption key can be intercepted, which can result in decipherment of the data.

To this end, a technique of transmitting encrypted data through a communication path different from that for an encryption key, thereby preventing deciphering of the encrypted data has been developed (see Japanese Patent Application Laid-open No. 2003-69547).

A technique of changing an encryption key at regular intervals is also provided to minimize damage even when the encryption key is cryptanalysed (see Japanese Patent Application Laid-open No. 2005-39643). However, this technique entails the need of sending a notification that the encryption key has been changed to a data decryption apparatus.

Techniques for appropriately sending the notification include a technique of sending a notification that an encryption key has been changed with use of a flag that represents a relationship between an expiration date-and-time of another encryption key, which is to be validated next time, and a current time (see Japanese Patent Application Laid-open No. 2005-217843).

According to this technique, when the current time is earlier than the time at which the encryption key is to be changed, and a time difference between the current time and the time at which the encryption key is to be changed, is equal to or smaller than a predetermined time difference, a data encryption apparatus sets the flag to "1", while the apparatus sets the flag to "0" for other conditions.

A data decryption apparatus obtains information on the current time, and, when the time difference between the current time and the time at which the encryption key is to be changed is equal to or smaller than the predetermined time difference and the flag is set to "1", sets the pre-change encryption key as a key for use in decryption.

When the time difference between the current time and the time at which the encryption key is to be changed is equal to or smaller than the predetermined time difference and the flag is set to "0", the data decryption apparatus sets the post-change encryption key as the decryption key.

When the time difference between the current time and the time at which the encryption key is to be changed is greater than the predetermined time difference, the data decryption apparatus sets an encryption key corresponding to the current time as the decryption key.

The conventional technique is, however, disadvantages in that the data decryption apparatus determines which encryption key is to be employed as a decryption key by referring to information on the current time along with information on the flag, which complicates processing.

In recent years, use of data communications from cellular phones has been increased. However, because cellular phones are limited in capacities of a CPU (Central Processing Unit), memory, power consumption, and the like, processing to be performed by a cellular phone is desirably minimized and simplified.

Accordingly, development of a technique that allows an integrated communications service for carrying out data communications of user data, as well as two-way communications of multimedia information, to transmit user data securely and efficiently has been desired.

SUMMARY OF THE INVENTION

It is an object of the present invention to at least partially solve the problems in the conventional technology.

According to one aspect of the present invention, a data decryption apparatus that decrypts encrypted data, includes a first data-receiving unit that receives a first data set, in which information on an encryption specification is embedded, through a first communication path; a time-information obtaining unit that obtains time information on a reception of the first data set by the first data receiving unit; a time-information storage unit that stores the time information obtained by the time-information obtaining unit with the information on the encryption specification associated therewith; a second data-receiving unit that receives a second data set through a second communication path, the second data set being encrypted based on the encryption specification and appended by time information on performing data encryption; and an encryption-specification selecting unit that selects an encryption specification for use in decryption of the second data set based on the time information stored in the time-information storage unit and the time information appended to the second data set received by the second data-receiving unit.

According to another aspect of the present invention, a data encryption apparatus that encrypts data, includes an information embedding unit that embeds information on an encryption specification in a first data set to be transmitted through a first communication path; a first data-transmitting unit that transmits the first data set, in which the information on the encryption specification is embedded by the information embedding unit, through the first communication path; a data encrypting unit that encrypts a second data set based on the information on the encryption specification when the first data set has been transmitted by the first data-transmitting unit; a time-information obtaining unit that obtains time information on an encryption of the second data set performed by the data encrypting unit; and a second data-transmitting unit that appends the time information obtained by the time-information obtaining unit to the second data set encrypted by the data encrypting unit, and transmits the second data set, to which the time information appended, through a second communication path.

According to still another aspect of the present invention, a data decryption apparatus that decrypts encrypted data, includes an information embedding unit that embeds information on an encryption specification in a first data set to be transmitted through a first communication path; a data transmitting unit that transmits the first data set, in which the information on the encryption specification is embedded by the information embedding unit, through the first communication path; a time-information obtaining unit that obtains time information on transmission of the first data set by the data transmitting unit; a time-information storage unit that stores the time information obtained by the time-information obtaining unit with the information on the encryption specification associated therewith; a data receiving unit that receives a second data set through a second communication path, the second data set being encrypted based on the encryption specification and appended by time information on performing data encryption; and an encryption-specification selecting unit that selects an encryption specification for use in decryption of the second data set based on the time information stored in the time-information storage unit and the time information appended to the second data set received by the data receiving unit.

According to still another aspect of the present invention, a data encryption apparatus that encrypts data, includes a data receiving unit that receives a first data set, in which information on an encryption specification is embedded, through a first communication path; a data encrypting unit that encrypts data based on the information on the encryption specification included in the first data set when the first data set has been received by the data receiving unit; a time-information obtaining unit that obtains time information on encryption of the data performed by the data encrypting unit; and a data transmitting unit that appends the time information obtained by the time-information obtaining unit to the data encrypted by the data encrypting unit, and transmits the data, to which the time information is appended, through a second communication path.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a data decryption apparatus and a data encryption apparatus according to the present invention will be explained below in detail with reference to the accompanying drawings.

First Embodiment

Figure 1:
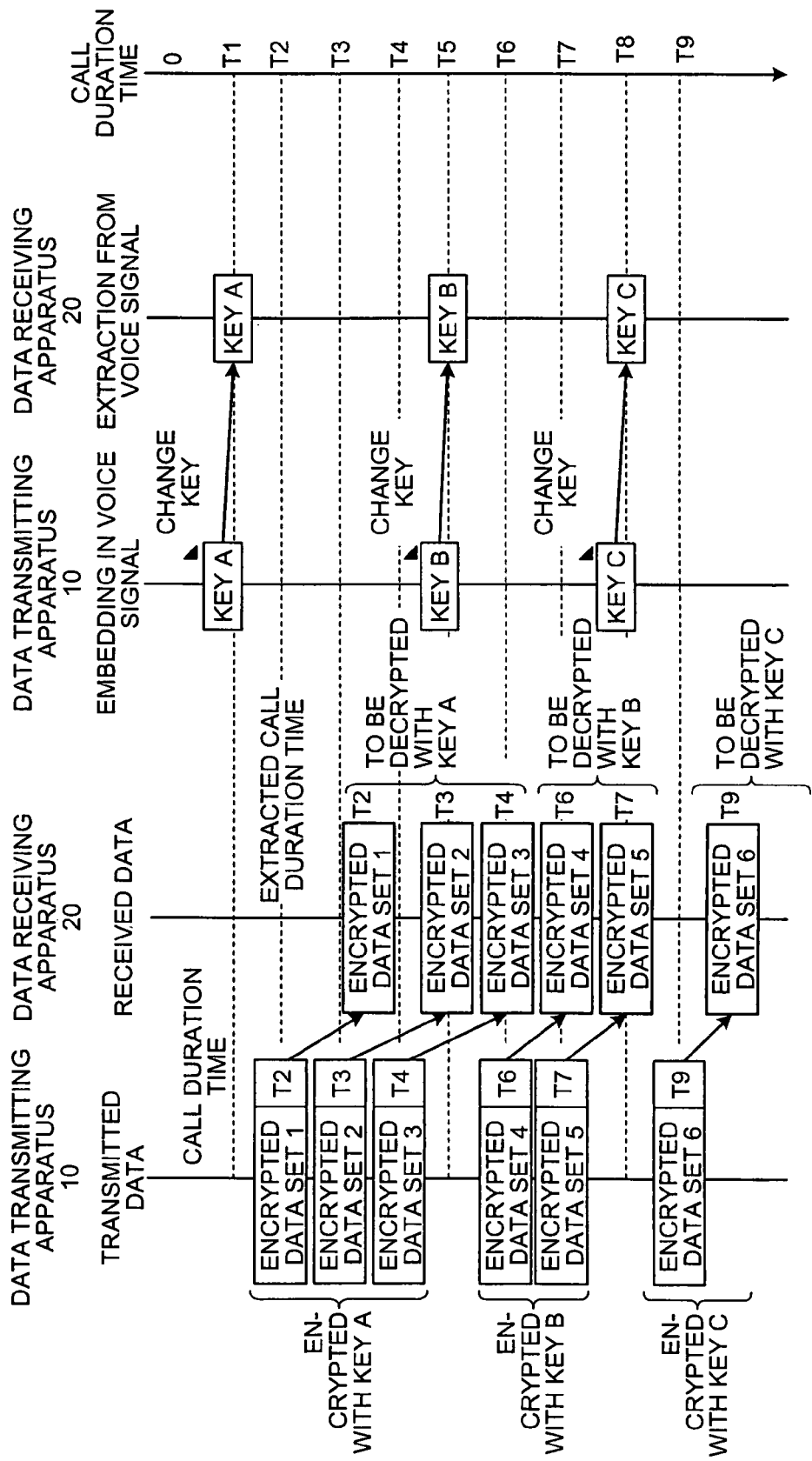
FIG. 1 is an explanatory diagram of the concept of data encrypting/decrypting processes according to a first embodiment.

The concept of data encrypting/decrypting processes according to a first embodiment will be explained first. FIG. 1 is an explanatory diagram of the concept of the data encrypting/decrypting processes according to the first embodiment. In the data encrypting/decrypting processes, a data transmitting apparatus 10 encrypts user data and transmits the encrypted data, and a data receiving apparatus 20 receives the encrypted user data transmitted from the data transmitting apparatus 10 and decrypts the data.

The data transmitting apparatus 10 and the data receiving apparatus 20, which have a voice call function, convert a voice of a user into a voice signal and exchange the voice signal bi-directionally, thereby carrying out a voice call between users.

The data transmitting apparatus 10 encrypts user data with an encryption key before transmission of the user data. The data transmitting apparatus 10 changes an encryption key to enhance security in transmission of the user data.

Upon changing an encryption key, the data transmitting apparatus 10 transmits the encryption key to the data receiving apparatus 20 by embedding the encryption key in a voice signal for a voice call. The encryption key is embedded by a digital watermarking technique so that the encryption key is less-easily extracted.

Upon receipt of the voice signal, the data receiving apparatus 20 extracts the encryption key from the voice signal, and sets the encryption key as a candidate of a decryption key for use in decryption of the user data. The data receiving apparatus 20 measures a call duration time elapsed since establishment of the voice call, and acquires a call duration time measured at a time when the encryption key has been extracted.

The data receiving apparatus 20 stores information on the thus-acquired call duration time with the encryption key associated therewith. The data transmitting apparatus 10 and the data receiving apparatus 20 repeat the process procedure described above each time of changing the encryption key.

FIG. 1 is an explanatory diagram of an example in which the data transmitting apparatus 10 changes an encryption key from a "key A" to a "key B", and then to a "key C", and the data receiving apparatus 20 extracts the "key A", the "key B", and the "key C" from a voice signal after a lapse of call durations T1, T5, and T8, respectively.

Thereafter, the data transmitting apparatus 10 checks whether a request to send user data has been received. Upon receipt of a request to send user data, the data transmitting apparatus 10 encrypts user data to be transmitted. In the same manner as that by the data receiving apparatus 20, the data transmitting apparatus 10 measures a call duration time elapsed since the establishment of the voice call, and acquires a call duration time measured when the user data has been encrypted.

The data transmitting apparatus 10 transmits the encrypted user data, to which the thus-acquired call duration time is appended, to the data receiving apparatus 20. FIG. 1 depicts an example in which the data transmitting apparatus 10 transmits encrypted user data, or "encrypted data sets 1 to 6", with call duration times T2, T3, T4, T6, T7, and T9 appended respectively thereto, to the data receiving apparatus 20.

Thereafter, the data receiving apparatus 20 receives the user data appended by information on a corresponding call duration time and encrypted, thereby obtaining the information on the call duration time appended thereto. The data receiving apparatus 20 selects, among the call duration times each measured upon extraction of the encryption key from the voice signal, a call duration time that is shorter than the call duration time obtained from the encrypted user data by a smallest margin.

The data receiving apparatus 20 subsequently sets an encryption key corresponding to the selected call duration time as the decryption key that decrypts the encrypted user data, and decrypts the encrypted user data.

In the example shown in FIG. 1, for decryption of the "encrypted data sets 1, 2, and 3", the call duration time T1 until extraction of encryption key, which is shorter than the call duration times T2, T3, and T4 corresponding to the "encrypted data sets 1, 2, and 3" by smallest margins, respectively, is selected. Hence, the "key A" corresponding to the call duration time T1 is selected as the decryption key for decryption of the "encrypted data sets 1, 2, and 3".

Similarly, for decryption of the "encrypted data sets 6 and 7", the call duration T5, which is shorter than the call duration times T6 and T7 corresponding to the "encrypted data sets 6 and 7" by smallest margins, respectively, is selected. Hence, the "key B" corresponding to the call duration time T5 until extraction of encryption key is selected as the decryption for decryption of the "encrypted data sets 6 and 7".

For decryption of the "encrypted data set 9", the call duration time T8 until extraction of encryption key, which is shorter than the call duration time T9, corresponding to the "encrypted data set 9" by a smallest margin, is selected. Hence, the "key C" corresponding to call duration time T8 until extraction of encryption key is selected as the decryption key for decryption of the "encrypted data set 9".

While the "encrypted data set 3" encrypted with the "key A" is received by the data receiving apparatus 20 after the encryption key has been changed from the "key A" to the "key B", performing processing as described above allows the data receiving apparatus 20 to carry out decryption using the "key A" appropriately.

Thus, because appropriate selection of an encryption key is attained only by utilizing the information on the call duration times, selection of an encryption key is simplified, which enables secure and efficient transmission of user data.

In the above example, information on an encryption key is embedded in a voice signal, which is one type of multimedia information. However, when the data transmitting apparatus 10 and the data receiving apparatus 20 have a video telephone function, the encryption key can be transmitted in the form of being embedded in image data for a video telephone, which is another type of multimedia information.

Figure 2:
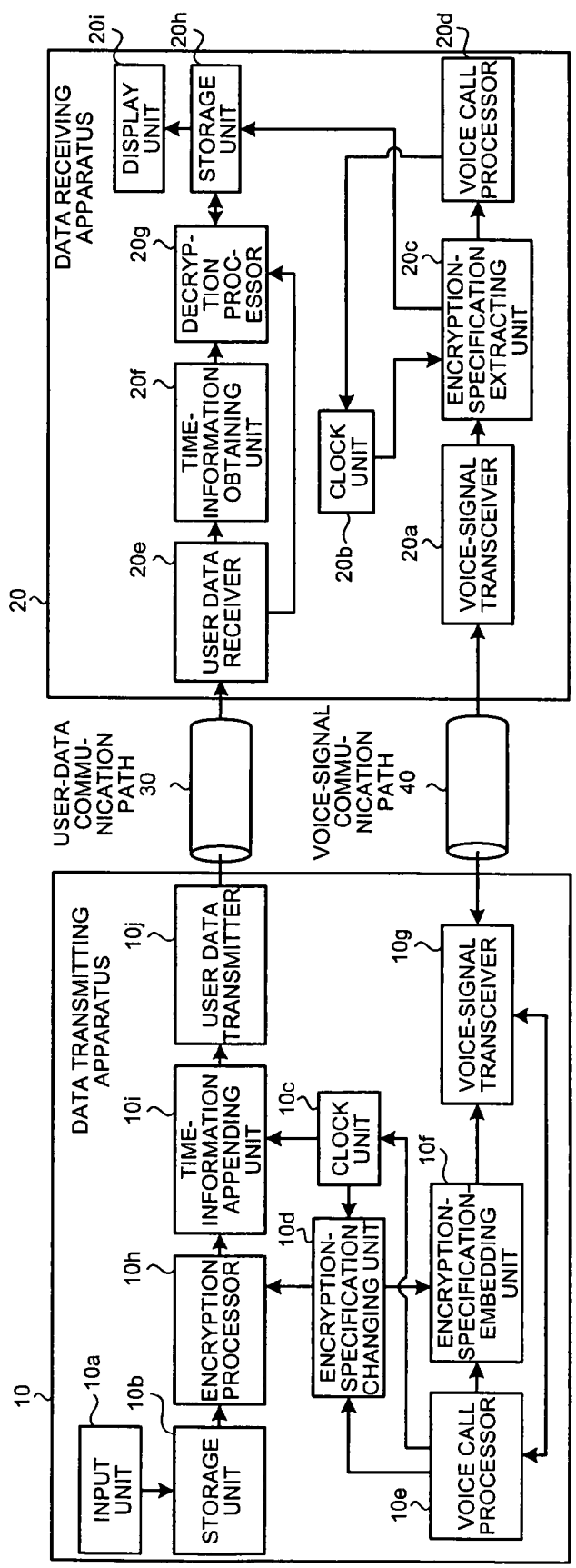
FIG. 2 is a diagram of a functional configuration of a communications system according to the first embodiment.

Next, a functional configuration of a communications system according to the first embodiment will be explained. FIG. 2 depicts the functional configuration of the communications system according to the first embodiment. As shown in FIG. 2, in the communications system, the data transmitting apparatus 10 and the data receiving apparatus 20 are connected through a user-data communication path 30 and a voice-signal communication path 40.

As described above with reference to FIG. 1, the data transmitting apparatus 10 is an apparatus that encrypts user data and transmits the encrypted data. The data receiving apparatus 20 is an apparatus that receives the user data transmitted from the data transmitting apparatus 10 and decrypts the same.

The data transmitting apparatus 10 and the data receiving apparatus 20, which have a voice call function, convert a voice of a user into a voice signal and exchange the voice signal bi-directionally, thereby establishing a voice call between users.

The data transmitting apparatus 10 has an input unit 10*a*, a storage unit 10*b*, a clock unit 10*c*, an encryption-specification changing unit 10*d*, a voice call processor 10*e*, an encryption-specification embedding unit 10*f*, a voice-signal transceiver 10*g*, an encryption processor 10*h*, a time-information appending unit 10*i*, and a user data transmitter 10*j*.

The input unit 10*a* is a processor that receives an input of user data, and the like, to be transmitted to the data receiving apparatus 20. The storage unit 10*b* is a processor that stores the input data received by the input unit 10*a*. The clock unit 10*c* is a processor that receives a signal indicating that a voice call has started from the voice call processor 10*e*, and measures a call duration time elapsed since the start of the voice call.

The encryption-specification changing unit 10*d* is a processor that changes an encryption key when the call duration time has reached a predetermined period. Specifically, the encryption-specification changing unit 10*d* obtains information on a call duration time from the clock unit 10*c*, and determines whether the call duration time has reached the predetermined period. When the call duration time is determined to have reached the predetermined period, the encryption-specification changing unit 10*d* changes the encryption key.

The voice call processor 10*e* is a processor that establishes the voice-signal communication path 40 between the voice call processor 10*e* and the data receiving apparatus 20, and exchanges a voice signal to and from the data receiving apparatus 20, thereby establishing a voice call between users.

The encryption-specification embedding unit 10*f* is a processor that embeds the encryption key, changed by the encryption-specification changing unit 10*d*, in a voice signal generated by the voice call processor 10*e* by a digital watermarking technique.

The voice-signal transceiver 10*g* is a processor that transmits a voice signal, generated by the voice call processor 10*e*, or a voice signal, in which an encryption key is embedded by the encryption-specification embedding unit 10*f*, through the voice-signal communication path 40 to the data receiving apparatus 20, and receives a voice signal transmitted from the data receiving apparatus 20.

The encryption processor 10h is a processor that reads user data stored in the storage unit 10b, and encrypts the user data with the encryption key changed by the encryption-specification changing unit 10d.

The time-information appending unit 10i is a processor that obtains the encrypted user data from the encryption processor 10h, obtains information on a call duration time measured at the present time from the clock unit 10c, and appends the information on the call duration time to the encrypted user data.

The user data transmitter 10j is a processor that transmits the encrypted user data, to which the information on the call duration time is appended by the time-information appending unit 10i, to the data receiving apparatus 20 through the user-data communication path 30.

The data receiving apparatus 20 has a voice-signal transceiver 20a, a clock unit 20b, an encryption-specification extracting unit 20c, a voice call processor 20d, a user data receiver 20e, a time-information obtaining unit 20f, a decryption processor 20g, a storage unit 20h, and a display unit 20i.

The voice-signal transceiver 20a is a processor that transmits a voice signal, generated by the voice call processor 20d, to the data transmitting apparatus 10 through the voice-signal communication path 40, and receives a voice signal, transmitted from the data transmitting apparatus 10, or a voice signal, in which an encryption key is embedded.

The clock unit 20b is a processor that receives a signal indicating that a voice call has started from the voice call processor 20d, and measures a call duration time elapsed since the start of the voice call. The encryption-specification extracting unit 20c is a processor that extracts the encryption key embedded in the voice signal transmitted from the data transmitting apparatus 10.

Specifically, upon receipt of a voice signal from the voice-signal transceiver 20a, the encryption-specification extracting unit 20c checks whether the voice signal includes an encryption key. When the voice signal is found to include an encryption key, the encryption-specification extracting unit 20c extracts the encryption key from the voice signal, and stores the key in the storage unit 20h.

Thereafter, the encryption-specification extracting unit 20c obtains information on a call duration time of the voice call from the clock unit 20b, and stores the thus-obtained information on the call duration time in the storage unit 20h with the extracted encryption key associated therewith.

Figure 3:
FIG. 3 is a diagram of an example of an encryption key information stored in a storage unit.

FIG. 3 is a diagram of an example of encryption key information 20j stored in the storage unit 20h. Information on encryption keys and call duration times are registered in the encryption key information 20j. Each call duration time is a call duration time obtained from the clock unit 20b at a time when the corresponding encryption key is extracted from a voice signal.

Returning to explanation with reference to FIG. 2, the voice call processor 20d is a processor that establishes the voice-signal communication path 40 between the voice call processor 20d and the data transmitting apparatus 10, and exchanges a voice signal to and from the data transmitting apparatus 10, thereby establishing a voice call between users.

The user data receiver 20e is a processor that receives the encrypted user data, to which the information on the call duration time measured when the user data has been encrypted is appended, from the data transmitting apparatus 10 through the user-data communication path 30.

The time-information obtaining unit 20f is a processor that obtains information on a call duration time from encrypted user data. The decryption processor 20g is a processor that selects an encryption key for use in decryption of user data based on information on a call duration time obtained by the time-information obtaining unit 20f and the encryption key information 20j shown in FIG. 3, and decrypts the user data.

Specifically, the decryption processor 20g selects, among the call duration times registered in the encryption key information 20j, a call duration time that is shorter than the call duration time obtained by the time-information obtaining unit 20f by a smallest margin.

The decryption processor 20g sets the encryption key corresponding to the selected call duration time as the decryption key that decrypts the encrypted user data, decrypts the encrypted user data, and stores the decrypted user data in the storage unit 20h.

The storage unit 20h is a processor that stores the encryption key information 20j shown in FIG. 3, user data obtained through decryption performed by the decryption processor 20g, and the like. The display unit 20i is a processor that displays the user data stored in the storage unit 20h, and like information.

Figure 4:
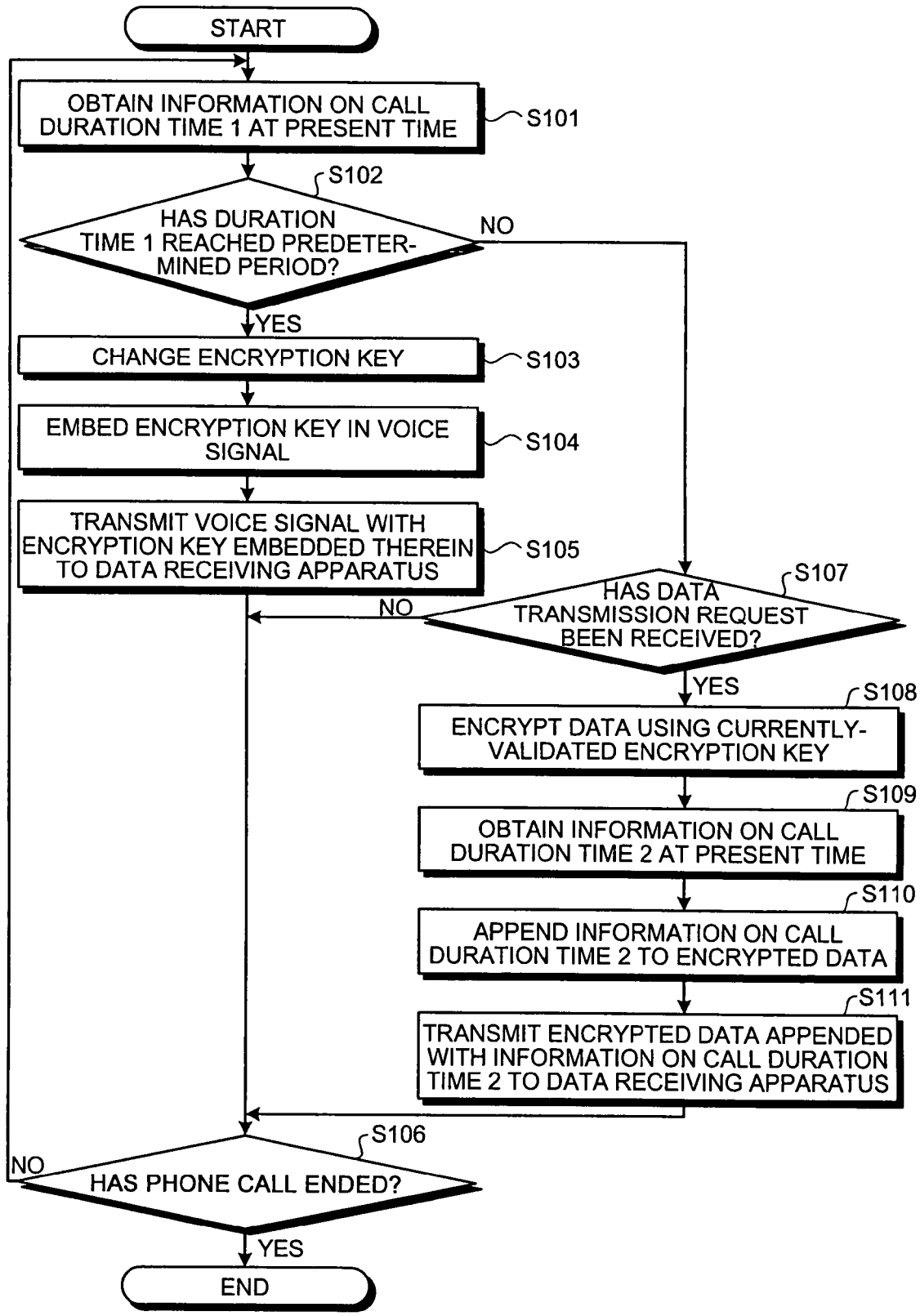
FIG. 4 is a flowchart of a process procedure for encryption key change/encrypted data transmission processes according to the first embodiment.

Next, a process procedure for encryption key change/encrypted data transmission processes according to the first embodiment will be explained. FIG. 4 is a flowchart of the process procedure for the encryption key change/encrypted data transmission processes according to the first embodiment.

The encryption key change/encrypted data transmission processes are processes performed by the data transmitting apparatus 10. The following description assumes that the data transmitting apparatus 10 and the data receiving apparatus 20 have already started a voice call process.

As shown in FIG. 4, the encryption-specification changing unit 10d of the data transmitting apparatus 10 first obtains information on a call duration time 1 measured at the present time from the clock unit 10c (step S101). The encryption-specification changing unit 10d checks whether the call duration time 1 has reached a predetermined period after a lapse of which an encryption key is to be changed (step S102).

When the call duration time 1 has reached the predetermined period (YES at step S102), the encryption-specification changing unit 10d changes the encryption key (step S103). The encryption-specification embedding unit 10f embeds the encryption key in a voice signal by a digital watermarking technique (step S104).

Subsequently, the voice-signal transceiver 10g transmits the voice signal, in which the encryption key is embedded, to the data receiving apparatus 20 (step S105). The encryption-specification changing unit 10d thereafter checks whether the voice call has ended (step S106).

When the voice call has ended (YES at step S106), the encryption key change/encrypted data transmission processes ends. When the voice call has not ended (NO at step S106), the process returns to step S101 to continue a process pertaining to the subsequent steps.

When the call duration time 1 has not reached the predetermined period at step S102 (NO at step S102), the encryption processor 10h checks whether a request to send user data issued by a user has been received (step S107).

When a request to send user data has not been received (NO at step S107), the process moves to step S106 to continue a process pertaining to the subsequent steps. When a request to send user data has been received (YES at step S107), the encryption processor 10h encrypts the user data using a currently-validated encryption key (step S108).

The time-information appending unit 10i obtains information on a call duration time 2 measured at the present time from the clock unit 10c (step S109), and appends the information on the call duration time 2 to the user data encrypted by the encryption processor 10*h* (step S110).

Thereafter, the user data transmitter 10*j* transmits the encrypted user data, to which the information on the call duration time 2 is appended, to the data receiving apparatus 20 (step S111), and the process moves to step S106 to continue a process pertaining to the subsequent steps.

Figure 5:
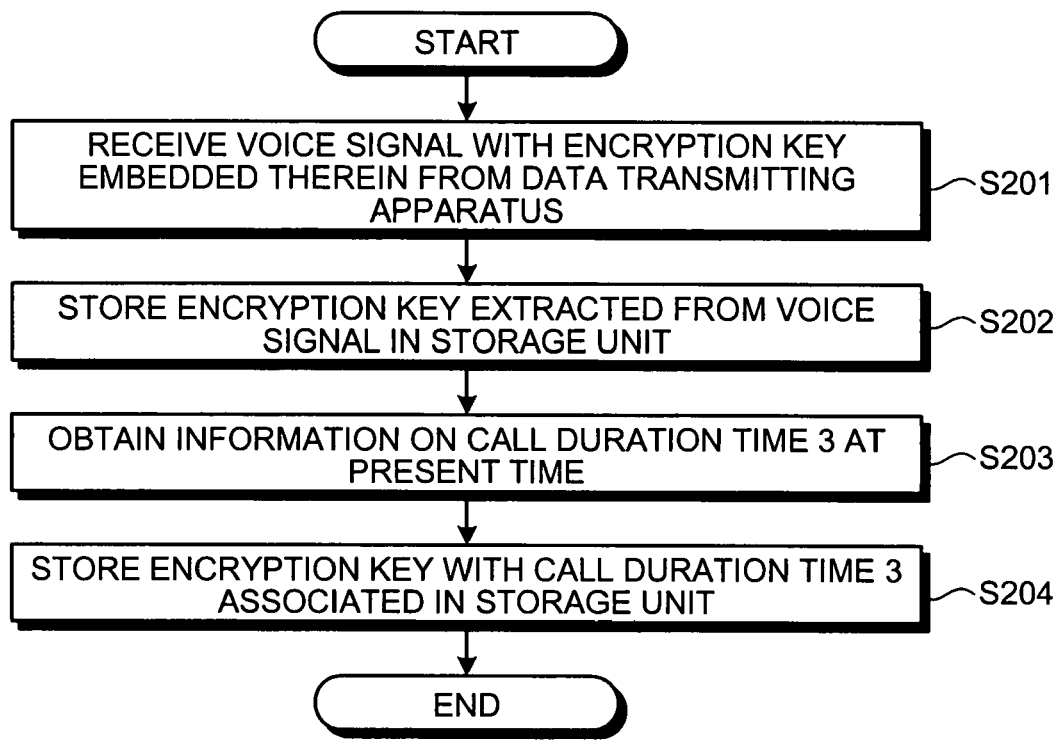
FIG. 5 is a flowchart of a process procedure for an encryption-key extracting process according to the first embodiment.

Next, a process procedure for an encryption-key extracting process according to the first embodiment will be explained. FIG. 5 is a flowchart of the process procedure for the encryption-key extracting process according to the first embodiment. The encryption-key extracting process is a process performed by the data receiving apparatus 20.

As shown in FIG. 5, the voice-signal transceiver 20*a* of the data receiving apparatus 20 receives a voice signal in which an encryption key is embedded from the data transmitting apparatus 10 (step S201). The encryption-specification extracting unit 20*c* extracts the encryption key from the voice signal, and stores the key in the storage unit 20*h* (step S202).

Subsequently, the encryption-specification extracting unit 20*c* obtains information on a call duration time 3 measured at the present time from the clock unit 20*b* (step S203). Thereafter, the encryption-specification extracting unit 20*c* stores the call duration time 3 in the storage unit 20*h* with the encryption key associated therewith as in the encryption key information 20*j* shown in FIG. 3 (step S204), and the encryption-key extracting process ends.

Figure 6:
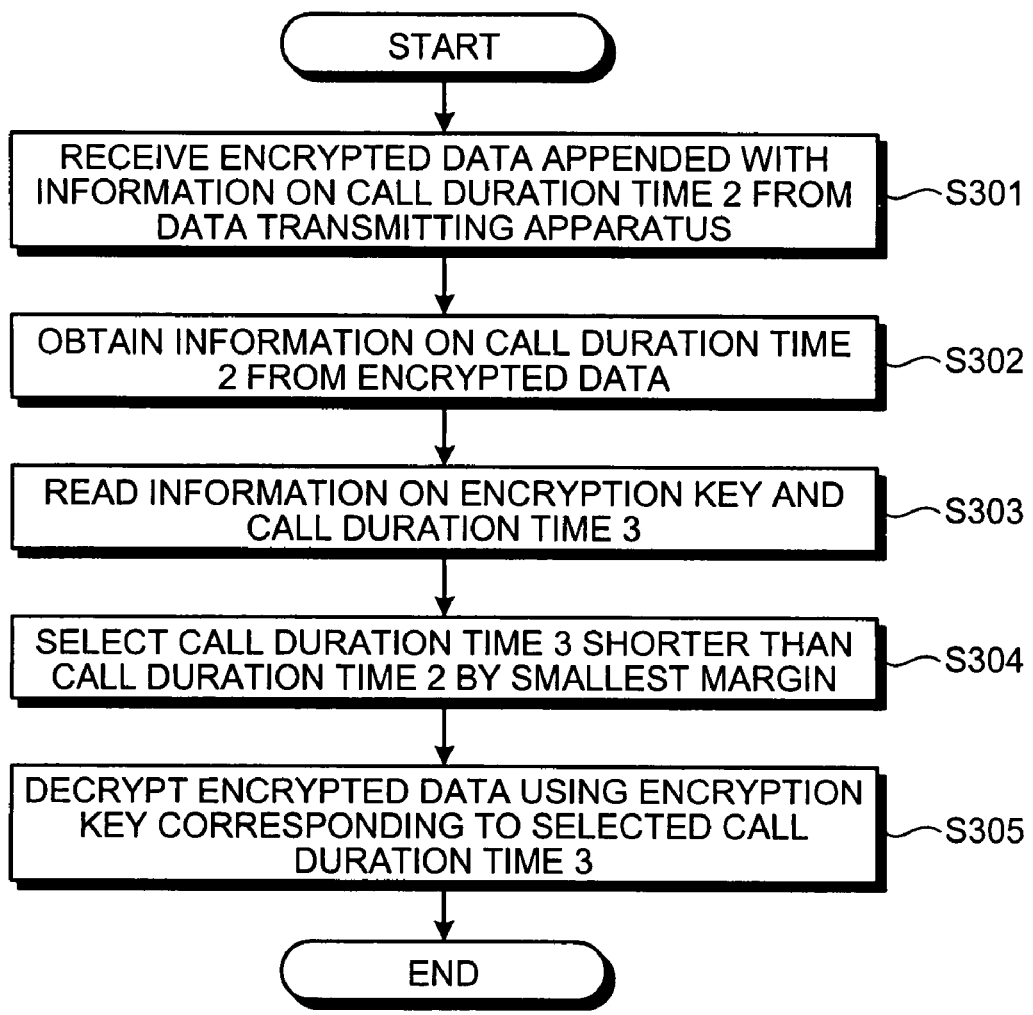
FIG. 6 is a flowchart of a process procedure for a data decrypting process according to the first embodiment.

Next, the process procedure for a data decrypting process according to the first embodiment will be explained. FIG. 6 is a flowchart of the process procedure for the data decrypting process according to the first embodiment. The data decrypting process is a process performed by the data receiving apparatus 20.

As shown in FIG. 6, the user data receiver 20*e* of the data receiving apparatus 20 first receives encrypted user data, to which the information on the call duration time 2 is appended, from the data transmitting apparatus 10 (step S301).

The time-information obtaining unit 20*f* obtains the information on the call duration time 2 from the encrypted user data (step S302). Subsequently, the decryption processor 20*g* read the information on the encryption keys and the call duration times 3 from the storage unit 20*h* (step S303).

The decryption processor 20*g* selects a call duration time 3, which is shorter than the call duration time 2 by a smallest margin (step S304). Thereafter, the decryption processor 20*g* decrypts the encrypted user data using the encryption key corresponding to the selected call duration time 3 (step S305), and the data decrypting process ends.

A certain length of a delay time is generated between embedding an encryption key in a voice signal, performed by the data transmitting apparatus 10, and receiving the voice signal to extract the encryption key from the voice signal, performed by the data receiving apparatus 20.

When a maximum value of the delay time (maximum delay time Dmax) is previously known, a method of adjusting timing, at which an encryption key has been embedded in a voice signal, and timing, at which the user data is to be encrypted, can be employed.

Figure 7:
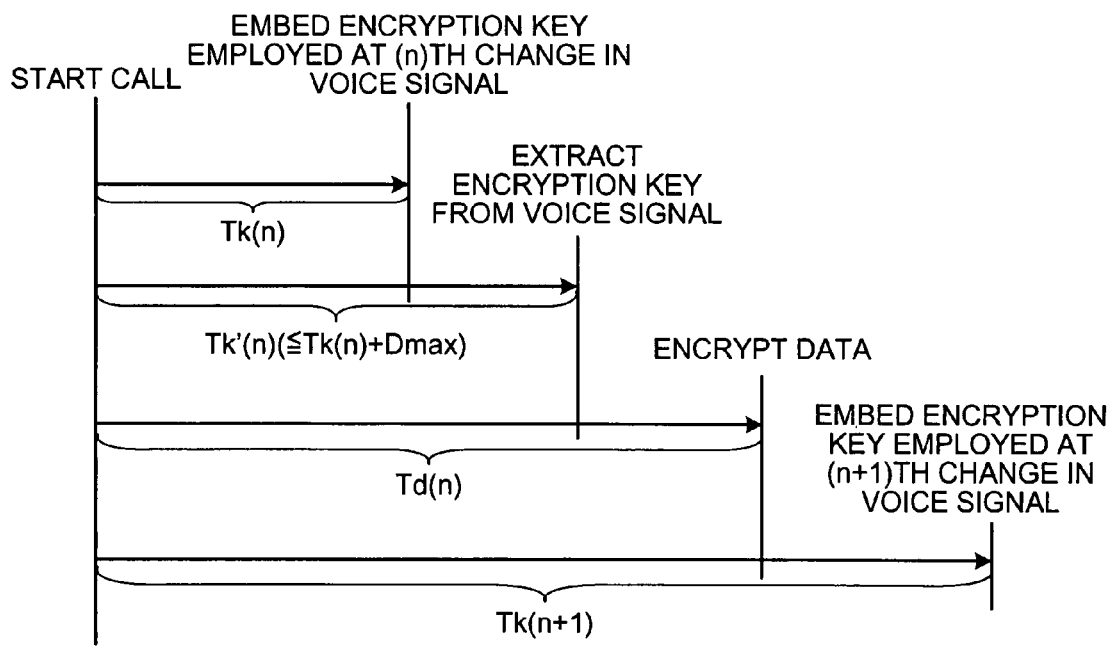
FIG. 7 is an explanatory diagram of an adjustment between timing at which an encryption key has been embedded, and timing at which data has been encrypted.

FIG. 7 is an explanatory diagram of adjustment between timing, at which an encryption key has been embedded, and timing, at which data has been encrypted. Reference letters Tk(n) and Tk(n+1) in FIG. 7 denote call duration times measured when the encryption-specification embedding unit 10*f* of the data transmitting apparatus 10 has embedded encryption keys employed at an "n"-th change and a "n+1"-th change, respectively.

Reference letter Td(n) denotes a call duration time measured when the encryption processor 10*h* of the data transmitting apparatus 10 has encrypted the user data.

Tk(n), Td(n), and Tk(n+1) are assumed to be adjusted to satisfy the following relation:

$$Tk(n)+D\max<Td(n)<Tk(n+1).$$

Specifically, the encryption processor 10*h* of the data transmitting apparatus 10 performs a process such that the data receiving apparatus 20 completes extraction of an encryption key from a voice signal first, and thereafter user data is encrypted and transmitted to the data receiving apparatus 20. Hence, the data receiving apparatus 20, which has already obtained the encryption key, is capable of decrypting encrypted user data without fail.

When the encryption-specification embedding unit 10*f* of the data transmitting apparatus 10 embeds an encryption key employed at an "n+1"-th change in a voice signal after the encryption processor 10*h* has encrypted user data, out-of-synchronization between timing, at which the data receiving apparatus 10 obtains information on the encryption key employed at the "n+1"-th change, and timing, at which the data receiving apparatus 10 receives the user data encrypted with the encryption key employed at an "n"-th change, is eliminated.

For example, in the example shown in FIG. 1, timing at which the data receiving apparatus 20 receives the encrypted data set 3 can be advanced to be forward of the timing, at which the data receiving apparatus 20 receives a voice signal that includes the "key B".

In the first embodiment, the encryption-specification embedding unit 10*f* of the data transmitting apparatus 10 embeds an encryption key in a voice signal. However, in place of the encryption key, information on an identifier for identifying the encryption key, information obtained by converting the encryption key by a predetermined method, information obtained by converting the identifier of the encryption key by a predetermined method, or like information can be embedded.

When an identifier of the encryption key is embedded in a voice signal, upon receipt of the voice signal, the encryption-specification extracting unit 20*c* of the data receiving apparatus 20 extracts the identifier embedded in the voice signal, and stores an encryption key corresponding to the identifier in the storage unit 20*h* as a candidate of an encryption key for use in decryption.

When information obtained by converting the encryption key by a predetermined method is embedded in a voice signal, upon receipt of the voice signal, the encryption-specification extracting unit 20*c* of the data receiving apparatus 20 extracts the encryption key embedded in the voice signal and converted by the predetermined method, and reconverts the encryption key into the pre-conversion encryption key. The encryption-specification extracting unit 20*c* stores the reconverted encryption key in the storage unit 20*h* as a candidate of an encryption key for use in decryption.

Furthermore, when information obtained by converting an identifier of the encryption key by a predetermined method is embedded in a voice signal, upon receipt of the voice signal, the encryption-specification extracting unit 20*c* of the data receiving apparatus 20 extracts the identifier embedded in the voice signal and converted by the predetermined method, and reconverts the identifier into the pre-conversion identifier. The encryption-specification extracting unit 20*c* stores an encryption key corresponding to the reconverted identifier in the storage unit 20*h* as a candidate of an encryption key for use in decryption.

As described above, in the first embodiment, the voice-signal transceiver 20a of the data receiving apparatus 20 receives a first data set, in which information on an encryption key is embedded, through a first communication path; the encryption-specification extracting unit 20c obtains time information on receipt of the first data set; the storage unit 20h stores the thus-obtained time information with the information on the encryption key associated therewith; the user data receiver 20e receives a second data set, to which time information on data encryption performed using the encryption key is appended, through a second communication path; and the decryption processor 20g selects an encryption key to be used in decryption of the second data set based on the time information stored in the storage unit 20h and the time information appended to the received second data set. Hence, utilizing the information on the call duration times allows secure and efficient apparatus-to-apparatus data exchange.

In the first embodiment, the first communication path is the voice signal communication path 40 for voice signal communications in a phone call; the encryption-specification extracting unit 20c of the data receiving apparatus 20 obtains information on a call duration time elapsed between a start of the phone call and reception of the voice signal as the time information; and the user data receiver 20e receives encrypted user data, to which information on a call duration time elapsed between the start of the phone call and encryption of the user data performed with the encryption key is appended, as the time information through the second communication path. Hence, utilizing the information on the call duration times eliminates the need of time synchronization between apparatuses that exchange data, thereby allowing secure and efficient data exchange between the apparatuses.

In the first embodiment, the encryption-specification embedding unit 10f of the data transmitting apparatus 10 embeds information on an encryption key in a first data set to be transmitted through a first communication path; the voice-signal transceiver 10g transmits the first data set, in which the information on the encryption key is embedded, through the first communication path; the encryption processor 10h encrypts a second data set with the encryption key when the first data has been transmitted; the time-information appending unit 10i obtains time information on encryption of the data, and appends the thus-obtained time information to the encrypted second data; and the user data transmitter 10j transmits the data, to which the time information is appended, through a second communication path. Hence, utilizing the time information allows secure and efficient data exchange between the apparatuses.

In the first embodiment, the encryption-specification changing unit 10d of the data transmitting apparatus 10 changes an encryption key for use in data encryption; and the encryption-specification embedding unit 10f embeds information on the changed encryption key in a voice signal to be transmitted through the voice-signal communication path 40. Hence, changing the encryption key allows more secure data exchange between the apparatuses.

In the first embodiment, the first communication path is the voice signal communication path 40 for voice signal communications in a phone call; the time-information appending unit 10i of the data transmitting apparatus 10 obtains information on a call duration time elapsed between a start of the phone call and data encryption as the time information, and appends the thus-obtained time information to the encrypted second data set; and the user data transmitter 10j transmits the data, to which the time information is appended, through the second communication path. Hence, utilizing the information on the call duration times eliminates the need of time synchronization between apparatuses that exchange data, thereby allowing secure and efficient data exchange between the apparatuses.

In the first embodiment, the voice signal includes at least one element of information on the encryption key, information on an identifier of the encryption key, information obtained by converting the encryption key by a predetermined method, and information obtained by converting the identifier of the encryption key by a predetermined method. Hence, apparatuses that exchange data can be notified of the encryption specification appropriately with each other.

Second Embodiment

The first embodiment has described an example in which the data transmitting apparatus changes an encryption key and transmits information on the changed encryption key to the data receiving apparatus. Alternatively, processing in which a data receiving apparatus changes an encryption key and transmit the changed encryption key to a data transmitting apparatus can be employed. Hence, a second embodiment describes an example in which a data receiving apparatus changes an encryption key and transmits information on the changed encryption key to a data transmitting apparatus.

Figure 8:
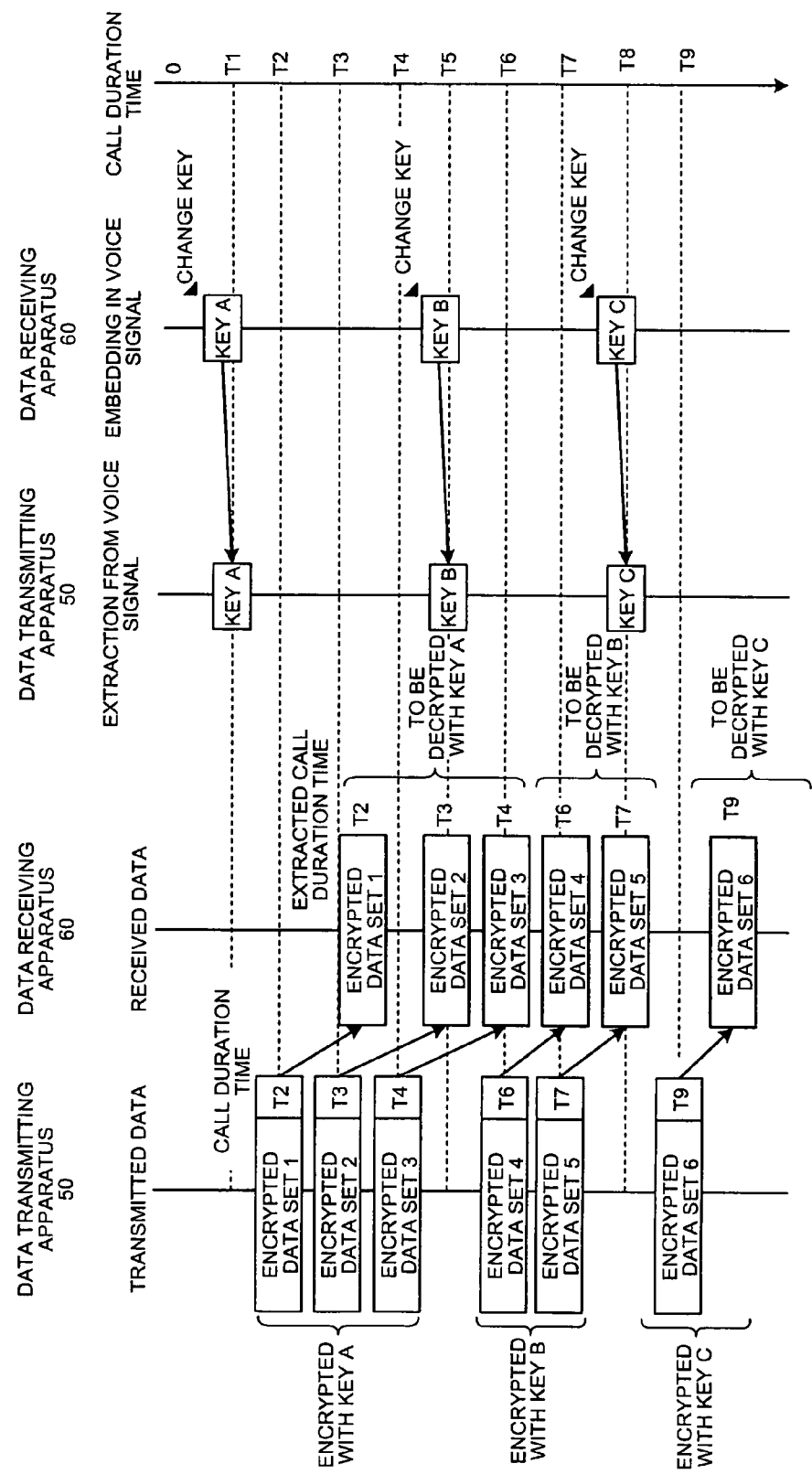
FIG. 8 is an explanatory diagram of a concept of data encrypting/decrypting processes according to a second embodiment.

The concept of data encrypting/decrypting processes according to the second embodiment will be explained first. FIG. 8 is an explanatory diagram of the concept of data encrypting/decrypting processes according to the second embodiment. In the data encrypting/decrypting processes, a data transmitting apparatus 50 encrypts user data and transmits the encrypted data, and a data receiving apparatus 60 receives the user data transmitted from the data transmitting apparatus 50 and decrypts the data.

The data transmitting apparatus 50 and the data receiving apparatus 60, which have a voice call function, convert a voice of a user into a voice signal, and exchange the voice signal bi-directionally, thereby carrying out a voice call between users.

The data receiving apparatus 60 changes an encryption key to enhance security in transmission of user data, and transmits the changed encryption key to the data transmitting apparatus 50. Specifically, upon changing the encryption key, the data receiving apparatus 60 transmits the encryption key to the data transmitting apparatus 50 by embedding the encryption key in a voice signal for the voice call. The encryption key is embedded by a digital watermarking technique so that the encryption key is less-easily extracted.

The data receiving apparatus 60 measures a call duration time elapsed since the establishment of the voice call to acquire a call duration time measured at a time when the encryption key has been transmitted. The data receiving apparatus 60 adds a predetermined period of time to the call duration time, thereby predicting a call duration time, after lapse of which the data transmitting apparatus 50 is expected to complete extraction of the encryption key from the voice signal.

The data receiving apparatus 60 stores information on the thus-predicted call duration time with the encryption key associated therewith. The data receiving apparatus 60 repeats such a process procedure as described above every time the encryption key is changed.

Upon receipt of the voice signal, the data transmitting apparatus 50 extracts the encryption key from the voice signal, and sets the encryption key as an encryption key for use in encryption of user data.

FIG. 8 is an example in which the data receiving apparatus 60 changes an encryption key from the "key A" to the "key B", and then to the "key C", and the data transmitting apparatus 50 extracts the "key A", the "key B", and the "key C" from a voice signal after a lapse of the call durations T1, T5, and T8, respectively.

Thereafter, the data transmitting apparatus 50 checks whether a request to send user data has been received. Upon receipt of a request to send user data, the data transmitting apparatus 50 encrypts user data to be transmitted with the latest encryption key.

In the same manner as that by the data receiving apparatus 60, the data transmitting apparatus 50 measures a call duration time elapsed since the establishment of the voice call, and acquires a call duration time measured when the user data has been encrypted.

The data transmitting apparatus 50 transmits the encrypted user data to the data receiving apparatus 60 with the thus-acquired call duration time appended thereto. FIG. 8 is an example in which the data transmitting apparatus 50 transmits encrypted user data, or the "encrypted data sets 1 to 6", to which the call duration times T2, T3, T4, T6, T7, and T9 are appended, respectively, to the data receiving apparatus 60.

Thereafter, the data receiving apparatus 60 receives the user data appended by information on a corresponding call duration time and encrypted, thereby obtaining the information on the call duration times appended thereto. The data receiving apparatus 60 selects, among the call duration times each measured when the data transmitting apparatus 50 extracts an encryption key from the voice signal, a call duration time that is shorter than a call duration time obtained from the encrypted user data by a smallest margin.

The data receiving apparatus 60 subsequently sets the encryption key corresponding to the selected call duration time as the decryption key that decrypts the encrypted user data, and decrypts the encrypted user data.

In the example shown in FIG. 8, for decryption of the "encrypted data sets 1, 2, and 3", the call duration time T1 until extraction of encryption key, which is shorter than the call duration times T2, T3, and T4 corresponding to the "encrypted data sets 1, 2, and 3" by smallest margins, respectively, is selected. Hence, the "key A" corresponding to the call duration time T1 until extraction of encryption key is selected as the decryption key for decryption of the "encrypted data sets, 1, 2, and 3".

Similarly, for decryption of the "encrypted data sets 6 and 7", the call duration time T5, which is shorter than the call duration times T6 and T7 corresponding to the encrypted data sets 6 and 7 by smallest margins, respectively, is selected. Hence, the "key B" corresponding to the call duration time T5 until extraction of encryption key is selected as the decryption for decryption of the "encrypted data sets 6 and 7".

For decryption of the "encrypted data set 9", the call duration time T8 until extraction of encryption key, which is shorter than the call duration time T9 corresponding to the "encrypted data set 9" by a smallest margin, is selected. Hence, the "key C" corresponding to the call duration time T8 until extraction of encryption key is selected as the decryption key for decryption of the "encrypted data set 9".

While the "encrypted data set 3" encrypted with the "key A" is received by the data receiving apparatus 60 after the encryption key has been changed from the "key A" to the "key B", performing processing as described above allows the data receiving apparatus 60 to carry out decryption with the "key A" appropriately.

Thus, because appropriate selection of an encryption key is attained by only utilizing the information on the call duration times, selection of an encryption key is simplified, which enables secure and efficient transmission of user data.

In the above example, information on an encryption key is embedded in a voice signal, which is one type of multimedia information. However, when the data transmitting apparatus 50 and the data receiving apparatus 60 has a video telephone function, the encryption key can be transmitted in the form of being embedded in image data for a video telephone, which is another type of multimedia information.

Figure 9:
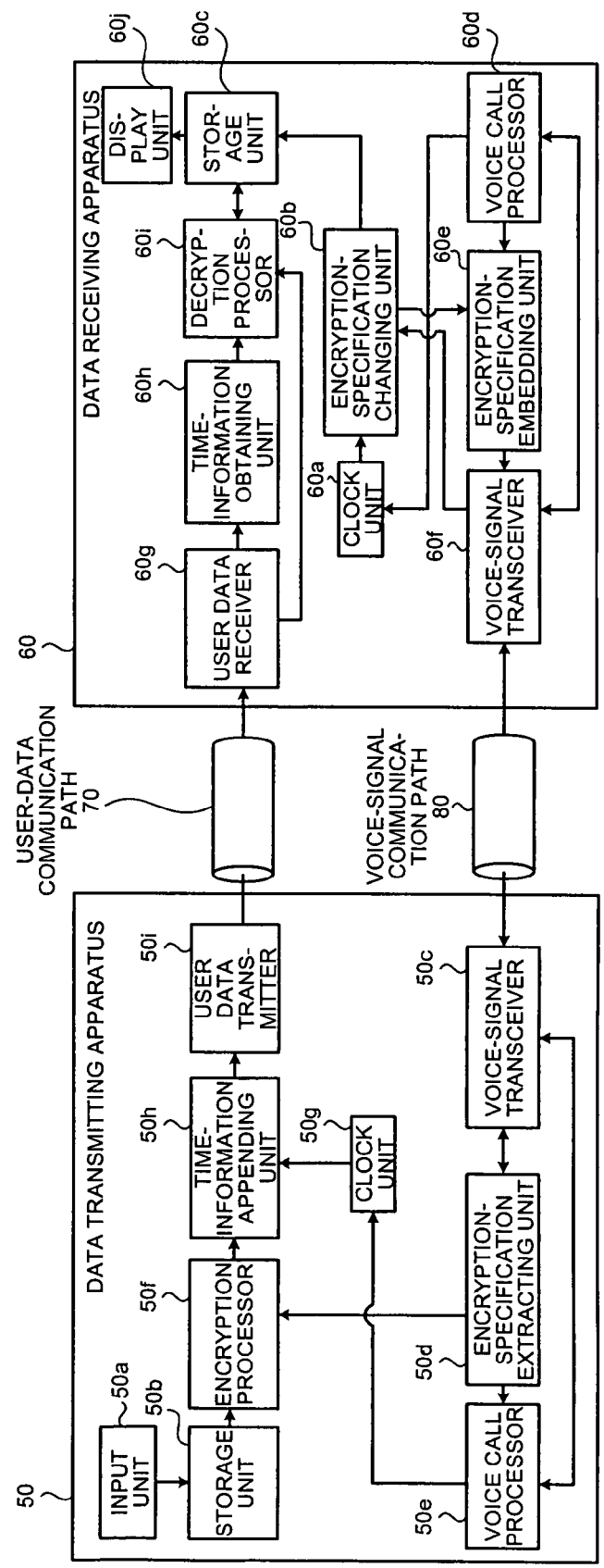
FIG. 9 is a diagram of a functional configuration of a communications system according to the second embodiment.

Next, a functional configuration of a communications system according to the second embodiment will be explained. FIG. 9 depicts the functional configuration of the communications system according to the second embodiment. As shown in FIG. 9, in the communications system, the data transmitting apparatus 50 and the data receiving apparatus 60 are connected through a user-data communication path 70 and a voice-signal communication path 80.

As described above with reference to FIG. 8, the data transmitting apparatus 50 is an apparatus that encrypts user data and transmits the encrypted data. The data receiving apparatus 60 is an apparatus that receives the user data transmitted from the data transmitting apparatus 50 and decrypts the same.

The data transmitting apparatus 50 and the data receiving apparatus 60, which have a voice call function, convert a voice of a user into a voice signal, and exchange the voice signal bi-directionally, thereby establishing a voice call between users.

The data transmitting apparatus 50 has an input unit 50a, a storage unit 50b, a voice-signal transceiver 50c, an encryption-specification extracting unit 50d, a voice call processor 50e, an encryption processor 50f, a clock unit 50g, a time-information appending unit 50h, and a user data transmitter 50i.

The input unit 50a is a processor that receives an input of user data, and the like, to be transmitted to the data receiving apparatus 60. The storage unit 50b is a processor that stores the input data received by the input unit 50a.

The voice-signal transceiver 50c is a processor that transmits a voice signal generated by the voice call processor 50e through the voice-signal communication path 80 to the data receiving apparatus 60, and receives a voice signal transmitted from the data receiving apparatus 60 or a voice signal, in which an encryption key is embedded by the data receiving apparatus 60.

The encryption-specification extracting unit 50d is a processor that extracts an encryption key embedded in a voice signal transmitted from the data receiving apparatus 60. Specifically, upon receipt of a voice signal from the voice-signal transceiver 50c, the encryption-specification extracting unit 50d checks whether the voice signal includes an encryption key. When the voice signal is found to include an encryption key, the encryption-specification extracting unit 50d extracts the encryption key from the voice signal, and outputs the extracted key to the encryption processor 50f.

The voice call processor 50e is a processor that establishes the voice-signal communication path 80 between the voice call processor 50e and the data receiving apparatus 60, and exchanges a voice signal to and from the data receiving apparatus 60, thereby establishing a voice call between users.

The encryption processor 50f is a processor that reads user data stored in the storage unit 10b, and encrypts the user data with the latest one of encryption keys extracted by the encryption-specification extracting unit 50d.

The clock unit 50g is a processor that receives a signal indicating that a voice call has started from the voice call processor 50e, and measures a call duration time elapsed since the start of the voice call. The time-information appending unit 50h is a processor that obtains encrypted user data from the encryption processor 50f, obtains information on a call duration time measured at the present time from the clock unit 50g, and appends the information on the call duration time to the encrypted user data.

The user data transmitter 50i is a processor that transmits the encrypted user data, to which the information on the call duration time is appended by the time-information appending unit 50h, to the data receiving apparatus 60 through the user-data communication path 70.

The data receiving apparatus 60 has a clock unit 60a, an encryption-specification changing unit 60b, a storage unit 60c, a voice call processor 60d, an encryption-specification embedding unit 60e, a voice-signal transceiver 60f, a user data receiver 60g, a time-information obtaining unit 60h, a decryption processor 60i, and a display unit 60j.

The clock unit 60a is a processor that receives a signal indicating that a voice call has started from the voice call processor 60d, and measures a call duration time elapsed since the start of the voice call. The encryption-specification changing unit 60b is a processor that changes an encryption key when the call duration time has reached a predetermined period.

Specifically, the encryption-specification changing unit 60b obtains information on a call duration time from the clock unit 60a, and determines whether the call duration time has reached the predetermined period. When the call duration time is determined to have reached the predetermined period, the encryption-specification changing unit 60b changes the encryption key.

When information on a changed encryption key is embedded in a voice signal and transmitted to the data transmitting apparatus 50, the encryption-specification changing unit 60b obtains information on a call duration time measured at a time when the voice signal has been transmitted to the data transmitting apparatus 50 from the clock unit 60a.

The encryption-specification changing unit 60b adds a predetermined period to the thus-obtained call duration time, thereby predicting a call duration time, after lapse of which the data transmitting apparatus 50 is expected to extract the encryption key from the voice signal. The encryption-specification changing unit 60b stores the thus-predicted call duration time in the storage unit 60c with the changed encryption key associated therewith.

The storage unit 60c is a processor that associates the encryption key changed by the encryption-specification changing unit 60b with the information on the call duration time after lapse of which the data transmitting apparatus 50 is to extract the encryption key from the voice signal, and stores the information as encryption key information. The storage unit 60c also stores user data obtained through decryption performed by the decryption processor 60i, and the like.

While the encryption key information is stored in the same form as that for the encryption information 20j shown in FIG. 3, unlike the call duration times in the encryption information 20j, the call duration times in the encryption key information denote call duration times each measured when the data transmitting apparatus 50 extracts a corresponding encryption key from a voice signal.

The voice call processor 60d is a processor that establishes the voice-signal communication path 80 between the voice call processor 60d and the data transmitting apparatus 50, and exchanges a voice signal to and from the data transmitting apparatus 50, thereby establishing a voice call between users.

The encryption-specification embedding unit 60e is a processor that embeds the encryption key, changed by the encryption-specification changing unit 60b, in a voice signal generated by the voice call processor 60d by a digital watermarking technique.

The voice-signal transceiver 60f is a processor that transmits a voice signal generated by the voice call processor 60d or a voice signal, in which an encryption key is embedded by the encryption-specification embedding unit 60e, through the voice-signal communication path 80 to the data transmitting apparatus 50, and receives a voice signal transmitted from the data transmitting apparatus 50.

The user data receiver 60g is a processor that receives encrypted user data, to which information on a call duration time measured when the user data has been encrypted is appended, from the data transmitting apparatus 50 through the user-data communication path 70.

The time-information obtaining unit 60h is a processor that obtains information on a call duration time from encrypted user data. The decryption processor 60i is a processor that selects an encryption key for use in decryption of user data based on information on a call duration time obtained by the time-information obtaining unit 60h and information on an encryption key stored in the storage unit 60c, and decrypts the user data.

The encryption key information referred to here is, as described above, information that is obtained by associating the encryption key changed by the encryption-specification changing unit 60b with the information on the call duration time measured at the time when, after the encryption key has been transmitted to the data transmitting apparatus 50, the data transmitting apparatus 50 has extracted the encryption key from the voice signal, and stored.

Specifically, the decryption processor 60i selects, among the call duration times registered in the encryption key information, a call duration time that is shorter than the call duration time obtained by the time-information obtaining unit 60h by a smallest-margin.

The decryption processor 60i sets the encryption key corresponding to the selected call duration time as the decryption key that decrypts the encrypted user data, decrypts the encrypted user data, and stores the decrypted user data in the storage unit 60c.

The display unit 60j is a processor that displays the user data stored in the storage unit 60c, and like information.

Figure 10:
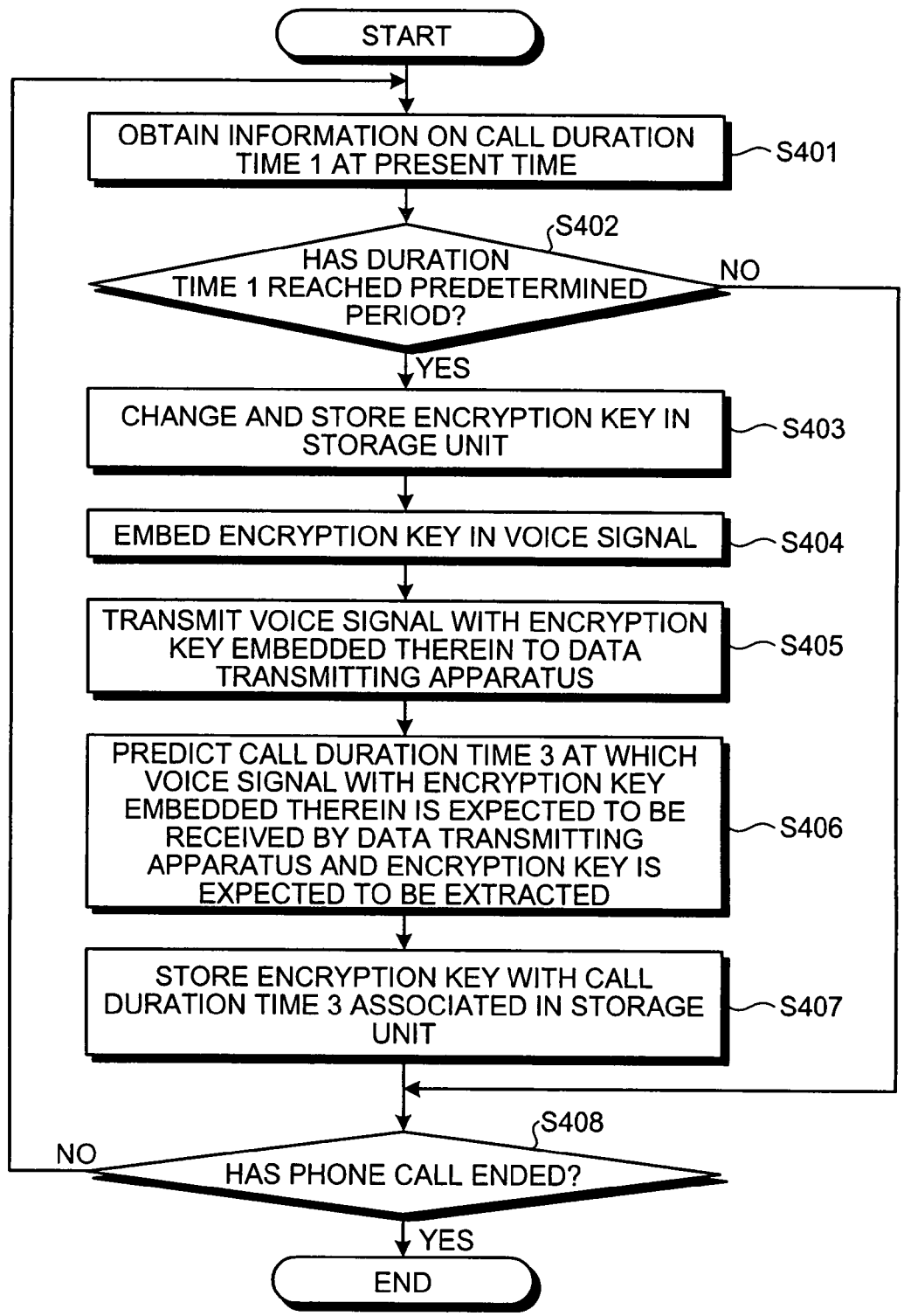
FIG. 10 is a flowchart of a process procedure for an encryption-key change process according to the second embodiment.

Next, a process procedure for an encryption-key change process according to the second embodiment will be explained. FIG. 10 is a flowchart of the process procedure for the encryption-key change process according to the second embodiment. The encryption-key change process is a process performed by the data receiving apparatus 60. The following description assumes that the data transmitting apparatus 50 and the data receiving apparatus 60 have already started a voice call process.

As shown in FIG. 10, the encryption-specification changing unit 60b of the data receiving apparatus 60 first obtains information on the call duration time 1 measured at the present time from the clock unit 60a (step S401). The encryption-specification changing unit 60b checks whether the call duration time 1 has reached a predetermined period after a lapse of which an encryption key is to be changed (step S402).

When the call duration 1 has reached the predetermined period (YES at step S402), the encryption-specification changing unit 60b changes the encryption key, and stores the key in the storage unit 60c (step S403). The encryption-specification embedding unit 60e embeds the encryption key in a voice signal by a digital watermarking technique (step S404).

Subsequently, the voice-signal transceiver 60f transmits the voice signal, in which the encryption key is embedded, to the data transmitting apparatus 50 (step S405). The encryption-specification changing unit 60b predicts a call duration time 3, after lapse of which the data transmitting apparatus 50 is expected to receive the voice signal, in which the encryption key is embedded, and to extract the encryption key from the voice signal (step S406).

Specifically, the encryption-specification changing unit 60b obtains the information on the call duration time measured at a time when the voice signal, in which the encryption key is embedded, has been transmitted to the data transmitting apparatus 50 from the clock unit 60a, and adds a predetermined period of time to the thus-obtained call duration time, thereby predicting the call duration time 3, after lapse of which the data transmitting apparatus 50 is expected to complete extraction of the encryption key from the voice signal.

Thereafter, the encryption-specification changing unit 60b stores the call duration time 3 associated with the encryption key in the storage unit 60c as the encryption key information (step S407). The encryption-specification changing unit 60b checks whether the voice call has ended (step S408).

When the voice call has ended (YES at step S408), the encryption-key change process ends. When the voice call has not ended (NO at step S408), the process returns to step S401 to continue a process pertaining to the subsequent steps.

Figure 11:
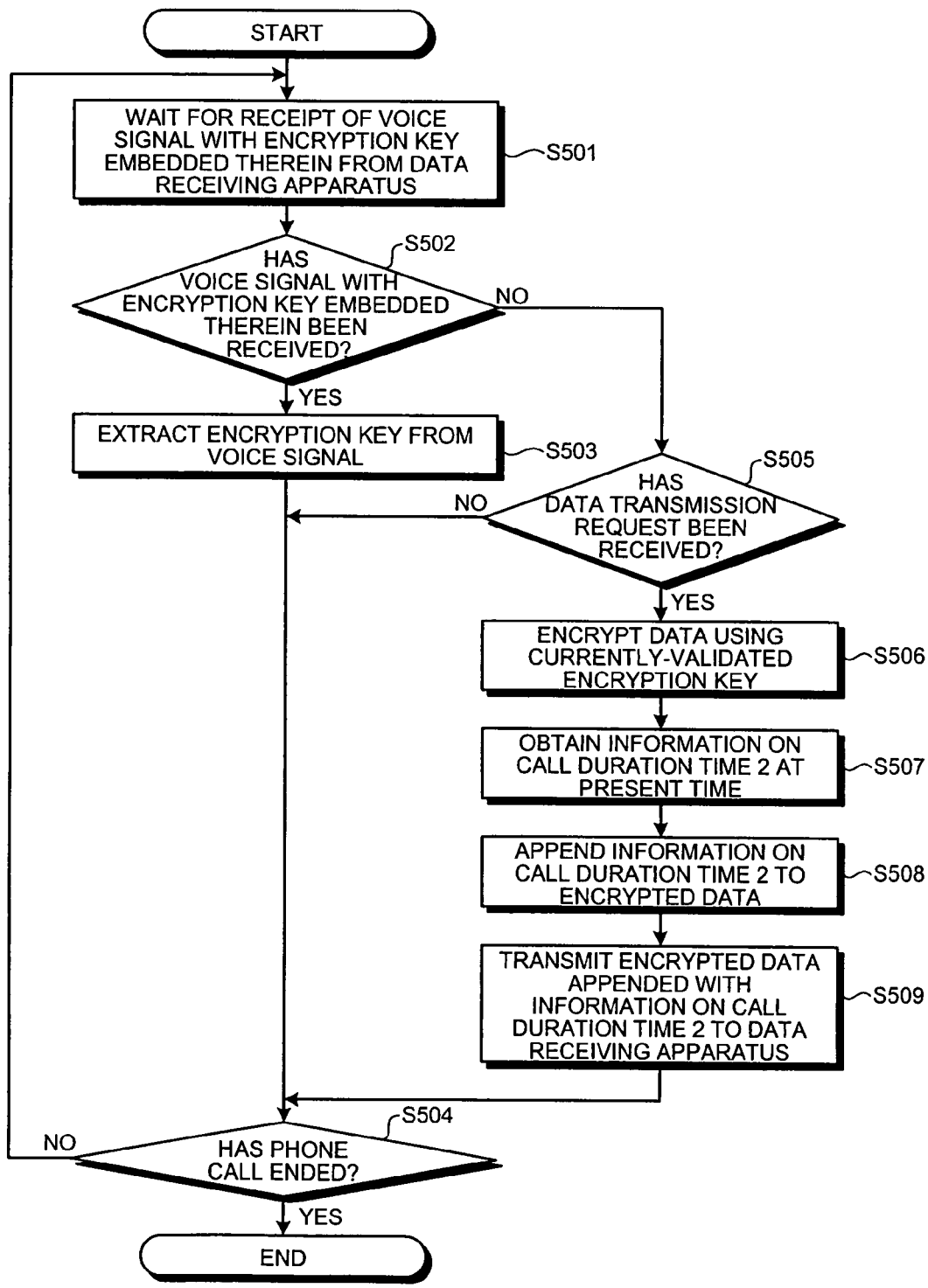
FIG. 11 is a flowchart of a process procedure for encryption key extraction/encrypted data transmission processes according to the second embodiment.

Next, a process procedure for encryption key extraction/encrypted data transmission processes according to the second embodiment will be explained. FIG. 11 is a flowchart of the process procedure for the encryption key extraction/encrypted data transmission processes according to the second embodiment. The encryption key extraction/encrypted data transmission processes are processes performed by the data transmitting apparatus 50.

As shown in FIG. 11, the voice-signal transceiver 50c of the data transmitting apparatus 50 first waits for a receipt of a voice signal, in which an encryption key is embedded, from the data receiving apparatus 60 (step S501), and checks whether a voice signal, in which an encryption key is embedded, has been received (step S502).

When a voice signal, in which an encryption key is embedded, has been received (YES in step S502), the encryption-specification extracting unit 50d extracts the encryption key from the voice signal (step S503). The voice-signal transceiver 50c thereafter checks whether the voice call has ended (step S504).

When the voice call has ended (YES at step S504), the encryption key extraction/encrypted data transmission processes ends. When the voice call has not ended (NO at step S504), the process returns to step S501 to continue a process pertaining to the subsequent steps.

When a voice signal, in which an encryption key is embedded, has not been received at step S502 (NO at step S502), the encryption processor 50f checks whether a request to send user data issued by a user has been received (step S505).

When a request to send user data has not been received (NO at step S505), the process moves to step S504 to continue a process pertaining to the subsequent steps. When a request to send user data has been received (YES at step S505), the encryption processor 50f encrypts the user data using a currently-validated encryption key (step S506).

The time-information appending unit 50h obtains information on the call duration time 2 measured at the present time from the clock unit 50g (step S507), and appends the information on the call duration time 2 to the user data encrypted by the encryption processor 50f (step S508).

Thereafter, the user data transmitter 50i transmits the encrypted user data, to which the information on the call duration time 2 is appended, to the data receiving apparatus 60 (step S509), and the process moves to step S504 to continue a process pertaining to the subsequent steps.

The decrypting process of user data performed by the data receiving apparatus 60 is performed in the same process procedure as that described with reference to FIG. 6. Specifically, the user data receiver 60g of the data receiving apparatus 60 receives encrypted user data, to which the information on the call duration time 2 is appended, from the data transmitting apparatus 10.

The time-information obtaining unit 60h obtains the information on the call duration time 2 from the encrypted user data. Subsequently, the decryption processor 60i reads the information on the encryption keys and the call duration times 3 from the storage unit 60c.

The decryption processor 60i selects a call duration time 3, which is shorter than the call duration time 2 by a smallest margin. Thereafter, the decryption processor 60i decrypts the encrypted user data using the encryption key corresponding to the selected call duration time 3, and the data decrypting process ends.

A certain length of a delay time is generated between embedding an encryption key in a voice signal, performed by the data receiving apparatus 60, and receiving the voice signal to extract the encryption key from the voice signal, performed by the data transmitting apparatus 50.

When a maximum value of the delay time (maximum delay time Dmax) is previously known, a method of adjusting timing, at which an encryption key has been embedded in a voice signal, and timing, at which the user data is to be encrypted, can be employed.

FIG. 7 is an explanatory diagram of adjustment between timing, at which an encryption key has been embedded, and timing, at which user data has been encrypted. Reference letters Tk(n) and Tk(n+1) in FIG. 7 denote call duration times measured when the encryption-specification embedding unit 60e of the data receiving apparatus 60 has embedded encryption keys employed at an "n"-th change and a "n+1"-th change, respectively.

Reference letter Tk'(n) denotes a call duration time measured when the encryption-specification extracting unit 50d of the data transmitting apparatus 50 has extracted the "n"-th encryption key in a voice signal; and reference letter Td(n) denotes a call duration time measured when the encryption processor 50f of the data transmitting apparatus 50 has encrypted user data.

Meanwhile, Tk(n) and Tk'(n) satisfy the following relations:

$$Tk(n)<Tk'(n)=Tk(n)+D\text{max; and}$$

$$Tk'(n)=Tk(n)+D\text{max}<Tk'(n)+D\text{max}.$$

In the first embodiment, reliable decryption of encrypted user data is attained by adjusting Tk(n), Td(n), and Tk(n+1) to satisfy the following relation:

$$Tk(n)+D\text{max}<Td(n)<Tk(n+1).$$

Accordingly, in the second embodiment, based on the relational equation between Tk(n) and Tk'(n), reliable decryption of encrypted user data is attained by adjusting Td(n) to satisfy the following relation:

$$Tk'(n)+D\text{max}<Td(n)<Tk'(n+1).$$

Specifically, the data transmitting apparatus 50 suspends the data encrypting process, performed by the encryption processor 50f, for the predetermined duration Dmax from the point in time Tk'(n), at which the encryption-specification extracting unit 50d has extracted the encryption key from the voice signal, and thereafter resumes the data encrypting process using the thus-extracted new encryption key.

Accordingly, out-of-synchronization between timing at which the data transmitting apparatus 50 updates an encryption key and timing at which the data receiving apparatus 60 updates the encryption key is prevented, which enables to decrypt encrypted data without fail.

In the second embodiment, the encryption-specification embedding unit 60e of the data receiving apparatus 60 embeds an encryption key in a voice signal. However, in place of the encryption key, information on an identifier for identifying the encryption key, information obtained by converting the encryption key by a predetermined method, information obtained by converting the identifier of the encryption key by a predetermined method, or like information can be embedded.

When an identifier of the encryption key is embedded in a voice signal, upon receipt of the voice signal, the encryption-specification extracting unit 50d of the data transmitting apparatus 50 extracts the identifier embedded in the voice signal, and outputs an encryption key corresponding to the identifier to the encryption processor 50f as an encryption key for use in encryption.

When information obtained by converting the encryption key by a predetermined method is embedded in a voice signal, upon receipt of the voice signal, the encryption-specification extracting unit 50d of the data transmitting apparatus 50 extracts the encryption key embedded in the voice signal and converted by the predetermined method, and reconverts the encryption key into the pre-conversion encryption key. The encryption-specification extracting unit 50d outputs the reconverted encryption key to the encryption processor 50f as an encryption key for use in encryption.

When information obtained by converting an identifier of the encryption key by a predetermined method is embedded in a voice signal, upon receipt of the voice signal, the encryption-specification extracting unit 50d of the data transmitting apparatus 50 extracts the identifier embedded in the voice signal and converted by the predetermined method, and reconverts the identifier into the pre-conversion identifier. The encryption-specification extracting unit 50d outputs an encryption key corresponding to the reconverted identifier to the encryption processor 50f as an encryption key for use in encryption.

As described above, in the second embodiment, the encryption-specification embedding unit 60e of the data receiving apparatus 60 embeds information on the encryption key in the first data set to be transmitted through the first communication path; the voice-signal transceiver 60f transmits the first data set, in which the information on the encryption key is embedded, through the first communication path; the encryption-specification changing unit 60b obtains time information on receipt of the first data set; the storage unit 60c stores the thus-obtained time information with the information on the encryption key associated therewith; the user data receiver 60g receives the second data set, to which time information on data encryption performed using the encryption key is appended, through a second communication path; and the decryption processor 60i selects an encryption key to be used in decryption of the second data set based on the time information stored in the storage unit 60c and the time information appended to the received second data set. Hence, utilizing the time information allows secure and efficient data exchange between the apparatuses.

In the second embodiment, the encryption-specification changing unit 60b of the data receiving apparatus 60 changes an encryption key for use in data encryption; and the encryption-specification embedding unit 60e embeds information on the changed encryption key in the first data set to be transmitted through the first communication path. Hence, changing the encryption key allows more secure data exchange between the apparatuses.

In the second embodiment, the first communication path is the voice signal communication path 80 for voice signal communications in a phone call; the encryption-specification changing unit 60b of the data receiving apparatus 60 obtains information on a call duration time elapsed between a start of the phone call and transmission of the voice signal as the time information; and the user data receiver 60g receives encrypted user data, to which information on a call duration time elapsed between the start of the phone call and encryption of the data performed using the encryption key is appended, through the user-data communication path 70. Hence, utilizing the information on the call duration times eliminates the need of time synchronization between apparatuses that exchange data, thereby allowing secure and efficient data exchange therebetween.

In the second embodiment, the voice-signal transceiver 50c of the data transmitting apparatus 50 receives the first data set, in which information on an encryption key is embedded, through the first communication path; upon receipt of the first data set, the encryption processor 50f encrypts data according to the information on the encryption specification included in the first data set; the time-information appending unit 50h obtains time information on encryption of the data, and appends the thus-obtained time information to the encrypted data; and the user data transmitter 50i transmits the data, to which the time information is appended, through the second communication path. Hence, utilizing the time information allows secure and efficient data exchange between the apparatuses.

In the second embodiment, the first communication path is the voice signal communication path 80 for voice signal communications in a phone call; the time information appending unit 50h of the data transmitting apparatus 50 obtains information on a call duration time elapsed between the start of the phone call and data encryption as the time information, and appends the thus-obtained time information to the encrypted user data; and the user data transmitter 50i transmits the user data, to which the time information is appended, through the user-data communication path 70. Hence, utilizing the information on the call duration times eliminates the need of time synchronization between apparatuses that exchange user data, thereby allowing secure and efficient exchange of user data therebetween.

In the second embodiment, the voice signal includes at least one element of information on the encryption key, information on an identifier of the encryption key, information obtained by converting the encryption key by a predetermined method, and information obtained by converting the identifier of the encryption key by a predetermined method. Hence, the apparatuses that exchange data can be notified of the encryption specification appropriately with each other.

While the embodiments of the present invention have been described above, variously modified embodiments other than the explained embodiments can be made without departing from the scope of the technical spirit of the appended claims.

For example, in the embodiments, an encryption key for use in decryption of user data is determined based on the call duration time elapsed since the start of the voice call. Alternatively, in place of the call duration time, the times can be employed for determination of an encryption key by causing the data transmitting apparatus and the data receiving apparatus to be in time synchronization.

Specifically, in the first embodiment, the encryption-specification extracting unit 20c of the data receiving apparatus 20 stores an encryption key with information on a time measured when the encryption key has been extracted from a voice signal associated therewith in the storage unit 20h. The information on the time is obtained from a clock (not shown) provided in the data receiving apparatus 20.

The time-information appending unit 10i of the data transmitting apparatus 10 appends the information on the time when the user data has been encrypted to the encrypted user data. The user data transmitter 10j transmits the encrypted user data appended by the information on the time to the data receiving apparatus 20. The information on the time is obtained from a clock (not shown) provided in the data transmitting apparatus 10.

The time-information obtaining unit 20f of the data receiving apparatus 20 obtains the information on the time from the encrypted user data. The decryption processor 20g selects, among the times stored in the storage unit 20h, a time that is earlier than the time obtained from the encrypted user data by a smallest margin.

Thereafter, the decryption processor 20g sets the encryption key corresponding to the selected time as the decryption key that decrypts the encrypted user data, and decrypts the encrypted user data.

In the second embodiment, the encryption-specification changing unit 60b of the data receiving apparatus 60 stores the encryption key with the information on a predicted time, at which data transmitting apparatus 50 is expected to extract the encryption key from the voice signal, associated therewith in the storage unit 60c. The predicted time is obtained by adding a predetermined period of time to the time measured at a time when the encryption key has been transmitted to the data transmitting apparatus 50. The information on the time is obtained from a clock (not shown) provided in the data receiving apparatus 60.

The time-information appending unit 50h of the data transmitting apparatus 50 appends the information on the time when the user data has been encrypted to the encrypted user data. The user data transmitter 50i transmits the encrypted user data, to which the information on the time is appended, to the data receiving apparatus 60. The information on the time is obtained from a clock (not shown) provided in the data receiving apparatus 50.

The time-information obtaining unit 60h of the data receiving apparatus 60 obtains the information on the time from the encrypted user data. The decryption processor 60i selects, among the times stored in the storage unit 60c, a time that is earlier than the time obtained from the encrypted user data by a smallest margin.

Thereafter, the decryption processor 60i sets the encryption key corresponding to the selected time as the decryption key that decrypts the encrypted user data, and decrypts the encrypted user data.

Figure 12:
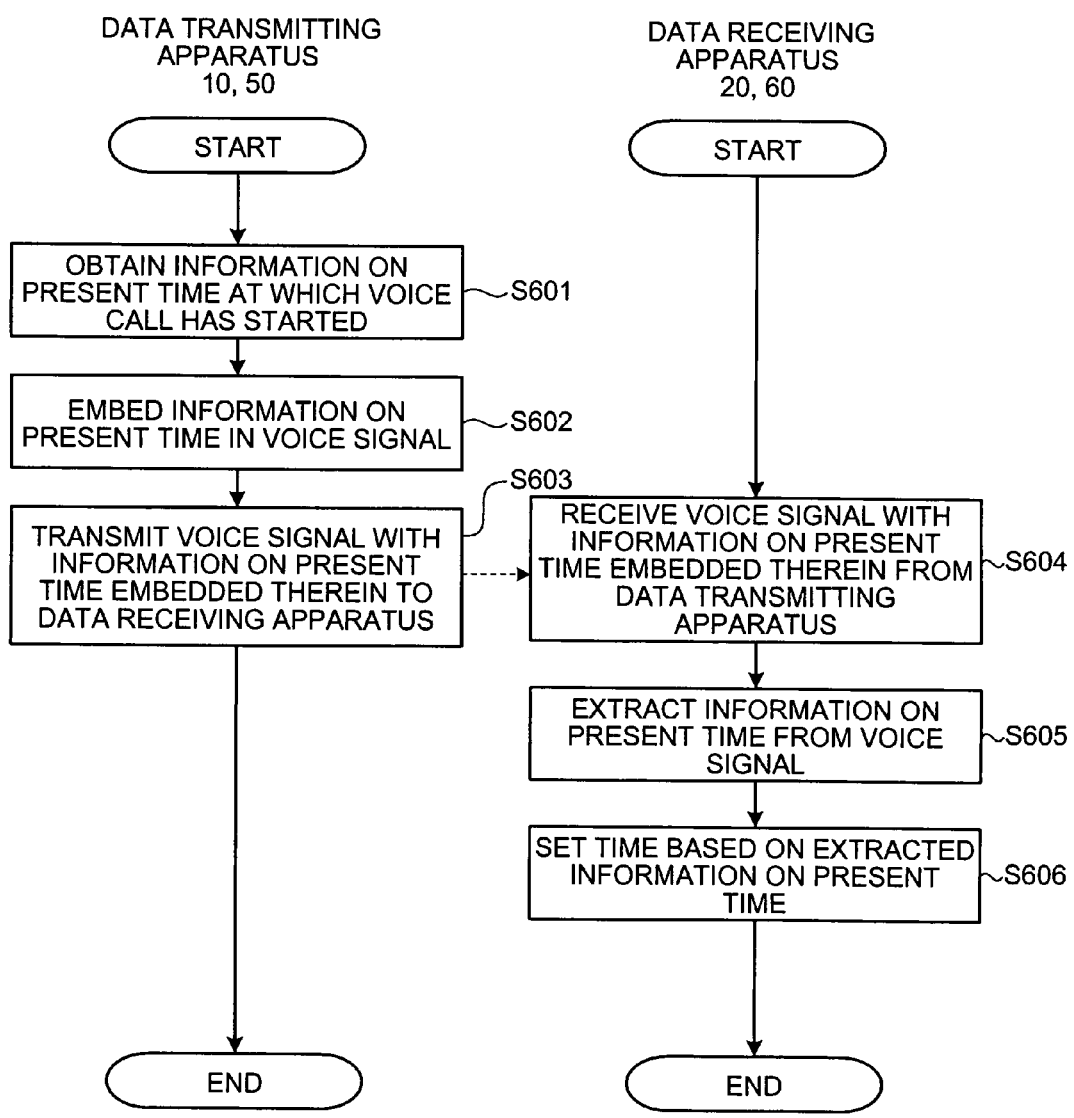
FIG. 12 is a flowchart of a process procedure of a time synchronizing process.

The process for time synchronization between the clock of the data transmitting apparatus 10 and the clock of the data receiving apparatus 20 is performed as described below. FIG. 12 is a flowchart of a process procedure for the time synchronization.

As shown in FIG. 12, the data transmitting apparatus 10, 50 obtains information on the present time measured upon start of a voice call from the clock provided in the data transmitting apparatus 10, 50 (step S601).

The data transmitting apparatus 10, 50 embeds the information on the present time in a voice signal (step S602), and transmits the voice signal, in which the information on the present time is embedded, to the data receiving apparatus 20, 60 (step S603).

Thereafter, the data receiving apparatus 20, 60 receives the voice signal, in which the information on the present time is embedded, from the data transmitting apparatus 10, 50 (step S604), and extracts the information on the present time from the voice signal (step S605).

The data receiving apparatus 20, 60 sets a time in the clock provided in the data receiving apparatus 20, 60 based on the thus-extracted information on the present time (step S606), and ends the time synchronizing process.

In the above procedure, the data transmitting apparatus 10, 50 transmits the information on the time to the data receiving apparatus 20, 60 to thereby attain time synchronization. Alternatively, the data receiving apparatus 20, 60 can transmit the information on the time to the data transmitting apparatus 10, 50 to thereby attain time synchronization. Further alternatively, each of the data transmitting apparatus 10, 50 and the data receiving apparatus 20, 60 can receive time information from other devices independently to thereby attain time synchronization.

As described above, in the present modification, the encryption-specification extracting unit 20c of the data receiving apparatus 20 obtains the information on the time of reception of the voice signal, in which the information on the encryption key is embedded, as the time information; and the user data receiver 20e receives the encrypted user data appended by the information on the time, at which the user data has been encrypted using the encryption key, as the time information. Hence, utilization of only the information on the times allows secure and efficient data exchange between the apparatuses.

In the present modification, the time-information appending unit 10i of the data transmitting apparatus 10 obtains the information on the time when the user data has been encrypted as the time information, and appends the thus-obtained time information to the encrypted user data; and the user data transmitter 10j transmits the user data, to which the time information is appended, through the user-data communication path 30. Hence, utilization of only the information on the times allows secure and efficient data exchange between the apparatuses.

In the present modification, the encryption-specification changing unit 60b of the data receiving apparatus 60 obtains the information on the time of transmission of the voice signal, in which the information on the encryption key is embedded, as the time information; and the user data receiver 60g receives the encrypted user data appended by the information on the time, at which the user data has been encrypted using the encryption key, through the user-data communication path 70. Hence, utilization of only the information on the times allows secure and efficient data exchange between the apparatuses.

In the present modification, the time-information appending unit 50h of the data transmitting apparatus 50 obtains the information on the time, at which the user data has been encrypted, as the time information, and appends the thus-obtained time information to the encrypted user data; and the user data transmitter 50i transmits the user data, to which the time information is appended, through the user-data communication path 70. Hence, utilization of only the information on the times allows secure and efficient data exchange between the apparatuses.

While, in the present embodiments, the encryption key is changed when the predetermined period of time has elapsed, not only the encryption key but also the encryption method can be changed. Specifically, the data transmitting apparatus 10 or the data receiving apparatus 60 changes the encryption key or the encryption specification for the encryption method when the predetermined period of time has elapsed. Examples of the encryption method include DES (Data Encryption Standard) and AES (Advanced Encryption Standard).

The data transmitting apparatus 10 or the data receiving apparatus 60 embeds the thus-changed encryption key and the encryption key as the information on the encryption specification in a voice signal, and transmits to the data receiving apparatus 20 or the data transmitting apparatus 50, respectively.

Figure 13:
FIG. 13 is a diagram of an example of encryption specification information to be transmitted in the form of being embedded in a voice signal.

FIG. 13 is a diagram showing an example of encryption specification information 90 to be transmitted in the form of being embedded in a voice signal. As shown in FIG. 13, the encryption specification information 90 includes information on an encryption key and an encryption-method ID. The encryption key is an encryption key for use in encryption of user data. The encryption-method ID is the identity that identifies an encryption method for use in encryption of the user data.

The data receiving apparatus 20, 60 stores the thus-changed encryption key and the encryption method. As described in the embodiments, the data receiving apparatus 20, 60 selects an encryption key and an encryption method that decrypt user data encrypted by the data transmitting apparatus 10, 50 based on the information on the call duration times or times, and decrypts the encrypted user data using the selected encryption key and the encryption method.

As described above, the information on the encryption specification includes the information on the encryption method. Hence, the apparatuses that exchange data can be notified of the encryption specification appropriately with each other, which allows secure and efficient data exchange therebetween.

Of the respective process explained in the embodiments, all or a part of the process explained as being performed automatically can be performed manually, or all or a part of the process explained as being performed manually can be performed automatically in a known method. The information including the process procedure, the control procedure, specific names, and various kinds of data and parameters shown in the specification or the drawings can be optionally changed, unless otherwise specified.

The respective constituent elements of the each apparatus shown in the drawings are functionally conceptual, and physically the same configuration is not always necessary. In other words, the specific mode of dispersion and integration of the each apparatus is not limited to the shown ones, and all or a part thereof can be functionally or physically dispersed or integrated in an optional unit, according to the various kinds of load and the status of use. Further, all or an optional part of the various process functions performed by the each apparatus can be realized by the CPU or a program analyzed and executed by the CPU, or can be realized as hardware by a wired logic.

The data encryption method and the data decryption method described in the embodiments can be realized by causing a computer such as a personal computer or a workstation to execute a program that is prepared beforehand. This program can be distributed via a network such as the Internet. Further, the program can be stored in a computer-readable recording medium, such as a hard disk, a flexible disk (FD), a CD-ROM, an MO, a DVD and the like, and executed by being read from the recording medium by the computer.

According to the present invention, a first data set, in which information on an encryption specification is embedded, is received through a first communication path; time information on receipt of the first data set is obtained; the thus-obtained time information is stored with the information on the encryption specification associated therewith; a second data set appended by time information on data encryption performed according to the encryption specification is received through a second communication path; and an encryption specification for use in decryption of the second data set is selected based on the stored time information and the time information appended to the received second data set. Hence, utilizing the time information yields an effect of enabling secure and efficient apparatus-to-apparatus data exchange.

According to the present invention, the first communication path is a communication path for data communications by voice data or image data in a phone call; the information on a call duration time elapsed between a start of the phone call and reception of the first data is obtained as the time information; and the second data set, to which a call duration time elapsed between the start of the phone call and data encryption performed according to the encryption specification is appended, is received through the second communication path. Hence, utilizing information on the call duration times yields an effect of eliminating the need of synchronization between apparatuses that exchange data, which allows secure and efficient data exchange therebetween.

According to the present invention, the first communication path is a communication path for data communications by voice data or image data in a phone call; information on a time of reception of the first data set is obtained as the time information; and the second data set appended by information on a time, at which the second data set has been encrypted according to the encryption specification, as the time information is received through the second communication path. Hence, only utilization of the information on the times yields an effect of enabling secure and efficient apparatus-to-apparatus data exchange.

According to the present invention, information on an encryption specification is embedded in a first data set to be transmitted through a first communication path; the first data set, in which the information on the encryption specification is embedded, is transmitted through the first communication path; when the first data set is transmitted, a second data set is encrypted according to the information on the encryption specification; time information on encryption of the second data set is obtained; the thus-obtained time information is appended to the encrypted second data set; and the data, to which the time information is appended, is transmitted through a second communication path. Hence, utilizing the time information yields an effect of enabling secure and efficient apparatus-to-apparatus data exchange.

According to the present invention, the first communication path is a communication path for data communications by voice data or image data in a phone call; information on a call duration time elapsed between a start of the phone call and a time when the second data set has been encrypted is obtained as the time information; the thus-obtained time information is appended to the encrypted second data set; and the data to which the time information is appended is transmitted through the second communication path. Hence, utilizing the information on the call durations yields an effect of eliminating the need of time synchronization between apparatuses that exchange data, thereby allowing secure and efficient data exchange therebetween.

According to the present invention, the first communication path is a communication path for data communications by voice data or image data in a phone call; information on a time at which the second data set has been encrypted is obtained as the time information; the thus-obtained time information is appended to the encrypted second data set; and the data to which the time information is appended is transmitted through the second communication path. Hence, only utilization of the information on the time yields an effect of enabling secure and efficient apparatus-to-apparatus data exchange.

According to the present invention, information on an encryption specification is embedded in a first data set to be transmitted through a first communication path; the first data set in which the information on the encryption specification is embedded is transmitted through the first communication path; time information on transmission of the first data set is obtained; the thus-obtained time information is stored with the information on the encryption specification associated therewith; a second data set, to which time information on data encryption performed according to the encryption specification is appended, is received through a second communication path; and an encryption specification for use in decryption of the second data set is selected based on the stored time information and the time information appended to the received second data set. Hence, utilizing the time information yields an effect of enabling secure and efficient apparatus-to-apparatus data exchange.

According to the present invention, the first communication path is a communication path for data communications by voice data or image data in a phone call; information on a call duration time elapsed between a start of the phone call and transmission of the first data is obtained as the time information; and the second data set, to which a call duration time elapsed between the start of the phone call and data encryption performed according to the encryption specification is appended, is received through the second communication path. Hence, utilizing the information on the call durations yields an effect of eliminating the need of synchronization between apparatuses that exchange data, thereby enabling secure and efficient data exchange therebetween.

According to the present invention, the first communication path is a communication path for data communications by voice data or image data in a phone call; information on a time of transmission of the first data set is obtained as the time information; and the second data set, to which information on a time of data encryption performed according to the encryption specification is appended as the time information, is received through the second communication path. Hence, only utilization of the information on the time yields an effect of enabling secure and efficient apparatus-to-apparatus data exchange.

According to the present invention, a first data set in which information on an encryption specification is embedded is received through a first communication path; upon receipt of the first data set, data is encrypted according to the information on the encryption specification included in the first data set; time information on encryption of the data is obtained; the thus-obtained time information is appended to the encrypted data; and the data to which the time information is appended is transmitted through a second communication path. Hence, utilizing the time information yields an effect of enabling secure and efficient apparatus-to-apparatus data exchange.

According to the present invention, the first communication path is a communication path for data communications by voice data or image data in a phone call; information on a call duration time elapsed between a start of the phone call and a time when the data has been encrypted is obtained as the time information; the thus-obtained time information is appended to the encrypted data; and the data to which the time information is appended is transmitted through the second communication path. Hence, utilizing the information on the call duration time yields an effect of eliminating the need of synchronization between apparatuses that exchange data, thereby enabling secure and efficient data exchange therebetween.

According to the present invention, the first communication path is a communication path for data communications by voice data or image data in a phone call; information on a time at which the data has been encrypted is obtained as the time information; the thus-obtained time information is appended to the encrypted data; and the data to which the time information is appended is transmitted through the second communication path. Hence, only utilization of the information on the time yields an effect of allowing secure and efficient apparatus-to-apparatus data exchange.

According to the present invention, the encryption specification for use in data encryption is changed; and the information on the encryption specification is embedded in the first data set to be transmitted through the first communication path. Hence, changing the encryption specification yields an effect of enabling more secure apparatus-to-apparatus data exchange.

According to the present invention, the information on the encryption specification includes at least one element of information on the encryption key, information on an identifier of the encryption key, information on an encryption method, information obtained by converting the encryption key by a predetermined method, information obtained by converting the identifier of the encryption key by a predetermined method, and information obtained by converting the encryption method by a predetermined method. Hence, an effect of allowing apparatuses that exchange data to appropriately notify of the encryption specification one another is yielded.

As described above, the data decryption apparatus and the data encryption apparatus according to the present invention are useful for a communications system required to exchange data between the apparatuses securely and efficiently.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data decryption apparatus that decrypts encrypted data, comprising:
 a first data-receiving unit that receives, each time an encryption specification is changed, a first data set, in which information on the changed encryption specification is embedded, through a first communication path;
 a time-information obtaining unit that obtains first time information corresponding to the reception time of each first data set by the first data receiving unit;
 a time-information storage unit that stores each first time information obtained by the time-information obtaining unit with each first data set;
 a second data-receiving unit that receives a second data set through a second communication path, the second data set being encrypted based on an encryption specification and appended by second time information corresponding to the performing of data encryption on the second data set; and an encryption-specification selecting unit that selects an encryption specification for use in decryption of the second data set from a plurality of encryption specifications based on first time information stored in the time-information storage unit and the second time information appended to the second data set received by the second data-receiving unit.

2. The data decryption apparatus according to claim 1, wherein
the first communication path is a communication path for data communications by voice data or image data in a phone call;
the first time information further corresponding to information on a call duration time elapsed between a start of the phone call and reception of the first data set; and
the second time information further corresponding to a call duration time elapsed between the start of the phone call and data encryption performed according to one of the plurality of encryption specifications.

3. The data decryption apparatus according to claim 1, wherein
the first communication path is a communication path for data communications by voice data or image data in a phone call.

4. The data decryption apparatus according to claim 1, wherein the first data set includes at least one of information on an encryption key, information on an identifier of the encryption key, information on an encryption method, information obtained by converting the encryption key by a predetermined method, information obtained by converting the identifier of the encryption key by a predetermined method, and information obtained by converting the encryption method by a predetermined method.

5. A data encryption apparatus that encrypts data, comprising:
an information embedding unit that embeds, each time the encryption specification is changed, information on the changed encryption specification in a first data set to be transmitted through a first communication path;
a first data-transmitting unit that transmits the first data set through the first communication path;
a data encrypting unit that encrypts a second data set based on an encryption specification;
a time-information obtaining unit that obtains first time information corresponding to an encryption of the second data set performed by the data encrypting unit; and
a second data-transmitting unit that appends the first time information obtained by the time-information obtaining unit to the second data set encrypted by the data encrypting unit, and transmits the second data set, to which the first time information is appended, through a second communication path.

6. The data encryption apparatus according to claim 5, further comprising:
an encryption-specification changing unit that changes the encryption specification for use in data encryption.

7. The data encryption apparatus according to claim 5, wherein
the first communication path is a communication path for data communications by voice data or image data in a phone call;
the time-information obtaining unit obtains information on a call duration time elapsed between a start of the phone call and data encryption performed by the data encrypting unit as second time information; and
the second data-transmitting unit appends the second time information obtained by the time-information obtaining unit to the second data set encrypted by the data encrypting unit, and transmits the second data set, to which the time information is appended, through the second communication path.

8. The data encryption apparatus according to claim 5, wherein
the first communication path is a communication path for data communications by voice data or image data in a phone call.

9. The data encryption apparatus according to claim 5, wherein the first data set includes at least one of information on an encryption key, information on an identifier of the encryption key, information on an encryption method, information obtained by converting the encryption key by a predetermined method, information obtained by converting the identifier of the encryption key by a predetermined method, and information obtained by converting the encryption method by a predetermined method.

10. A data decryption apparatus that decrypts encrypted data, comprising:
an information embedding unit that embeds, each time the encryption specification is changed, information on the changed encryption specification in a first data set to be transmitted through a first communication path;
a data transmitting unit that transmits the first data set through the first communication path;
a time-information obtaining unit that obtains first time information corresponding to transmission of the first data set by the data transmitting unit;
a time-information storage unit that stores each first time information obtained by the time-information obtaining unit with each first data set;
a data receiving unit that receives a second data set through a second communication path, the second data set being encrypted based on an encryption specification and appended by second time information corresponding to the performing of data encryption; and
an encryption-specification selecting unit that selects an encryption specification for use in decryption of the second data set from a plurality of encryption specifications based on first time information stored in the time-information storage unit and the second time information appended to the second data set received by the data receiving unit.

11. The data decryption apparatus according to claim 10, further comprising:
an encryption-specification changing unit that changes the encryption specification for use in data encryption.

12. The data encryption apparatus according to claim 10, wherein
the first communication path is a communication path for data communications by voice data or image data in a phone call;
the first time information further corresponding to information on a call duration time elapsed between a start of the phone call and transmission of the first data set; and
the second time information further corresponding to call duration time elapsed between the start of the phone call and data encryption performed based on one of the plurality of encryption specifications.

13. The data encryption apparatus according to claim 10, wherein the first communication path is a communication path for data communications by voice data or image data in a phone call.

14. The data encryption apparatus according to claim 10, wherein the first data set includes at least one of information on an encryption key, information on an identifier of the encryption key, information on an encryption method, information obtained by converting the encryption key by a predetermined method, information obtained by converting the identifier of the encryption key by a predetermined method, and information obtained by converting the encryption method by a predetermined method.

15. A data encryption apparatus that encrypts data, comprising:
   a data receiving unit that receives, each time an encryption specification is changed, a first data set, in which information on the changed encryption specification is embedded, through a first communication path;
   a data encrypting unit that encrypts data based on an encryption specification included in the first data set;
   a time-information obtaining unit that obtains first time information corresponding to encryption of the data performed by the data encrypting unit; and
   a data transmitting unit that appends the first time information obtained by the time-information obtaining unit to the data encrypted by the data encrypting unit, and transmits the data, to which the first time information is appended, through a second communication path.

16. The data encryption apparatus according to claim 15, wherein
   the first communication path is a communication path for data communications by voice data or image data in a phone call;
   the time-information obtaining unit obtains information on a call duration time elapsed between a start of the phone call and data encryption performed by the data encrypting unit as second time information; and
   the data receiving unit appends the second time information obtained by the time-information obtaining unit to the data encrypted by the data encrypting unit, and transmits the data, to which the time information is appended, through the second communication path.

17. The data encryption apparatus according to claim 15, wherein
   the first communication path is a communication path for data communications by voice data or image data in a phone call.

18. The data encryption apparatus according to claim 15, wherein the first data set includes at least one of information on an encryption key, information on an identifier of the encryption key, information on an encryption method, information obtained by converting the encryption key by a predetermined method, information obtained by converting the identifier of the encryption key by a predetermined method, and information obtained by converting the encryption method by a predetermined method.

* * * * *